US009699817B2

(12) United States Patent
Ginnela et al.

(10) Patent No.: US 9,699,817 B2
(45) Date of Patent: Jul. 4, 2017

(54) METHODS TO PREEMPTIVELY SEARCH AND SELECT LTE-DIRECT EXPRESSIONS FOR UNINTERRUPTED DEVICE-TO-DEVICE COMMUNICATION

(71) Applicant: QUALCOMM Incorporated, San Diego, CA (US)

(72) Inventors: Vani Chaitanya Ginnela, Secunderabad (IN); Praveen Nagaraja Kona, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 14/572,345

(22) Filed: Dec. 16, 2014

(65) Prior Publication Data
US 2016/0174273 A1 Jun. 16, 2016

(51) Int. Cl.
H04W 76/02 (2009.01)
H04W 8/00 (2009.01)
(Continued)

(52) U.S. Cl.
CPC ......... *H04W 76/023* (2013.01); *H04L 67/104* (2013.01); *H04W 8/005* (2013.01);
(Continued)

(58) Field of Classification Search
CPC . H04W 8/005; H04W 28/0289; H04W 4/005; H04W 76/023; H04W 76/043; H04L 67/104
See application file for complete search history.

(56) References Cited

U.S. PATENT DOCUMENTS 8,855,134 B2 * 10/2014 Tavildar ................ H04W 48/16 370/328
9,191,828 B2 * 11/2015 Li ..................... H04W 74/0816
(Continued)

FOREIGN PATENT DOCUMENTS

WO 2014130153 A1 8/2014

OTHER PUBLICATIONS

"3rd Generation Partnership Project; Technical Specification Group Services and System Aspects; Proximity-based services (ProSe); Stage 2 (Release 12)," 3GPP Standard; 3GPP TS 23.303, 3rd Generation Partnership Project (3GPP), Mobile Competence Centre; 650, Route Des Lucioles ; F-06921 Sophia-Antipolis.
(Continued)

Primary Examiner — Devan Sandiford
(74) Attorney, Agent, or Firm — MG-IP Law, P.C.

(57) ABSTRACT

The disclosure generally relates to preemptively searching and selecting LTE-Direct Expressions to maintain continuity in availing services via LTE-Direct and thereby support uninterrupted device-to-device (D2D) communication when a current LTE-Direct session experiences loss or degradation. For example, in various embodiments, a wireless device may establish a first D2D connection with a peer device to access a service shared at the peer device. The wireless device may further discover at least one alternate peer device sharing the service while the first D2D connection is active such that a second D2D connection with the at least one alternate peer device can be established in response to loss and/or degradation associated with the first D2D connection.

22 Claims, 18 Drawing Sheets

(51) Int. Cl.
*H04L 29/08* (2006.01)
*H04W 16/08* (2009.01)
*H04W 76/04* (2009.01)

(52) U.S. Cl.
CPC .......... *H04W 76/027* (2013.01); *H04W 16/08* (2013.01); *H04W 76/043* (2013.01)

(56) References Cited

U.S. PATENT DOCUMENTS

| | | | |
|---|---|---|---|
| 2008/0148379 A1* | 6/2008 | Xu | H04L 29/125 726/11 |
| 2009/0046658 A1* | 2/2009 | Krishnaswamy | H04W 12/04 370/331 |
| 2009/0252134 A1* | 10/2009 | Schlicht | H04L 1/0015 370/338 |
| 2013/0073671 A1 | 3/2013 | Nagpal et al. | |
| 2013/0084854 A1* | 4/2013 | Selander | H04W 4/008 455/426.1 |
| 2013/0324114 A1* | 12/2013 | Raghothaman | H04W 76/023 455/426.1 |
| 2014/0022986 A1 | 1/2014 | Wu et al. | |
| 2014/0122607 A1* | 5/2014 | Fodor | H04W 76/023 709/204 |
| 2014/0162687 A1 | 6/2014 | Edge | |
| 2014/0200003 A1* | 7/2014 | Kodali | H04W 36/30 455/436 |
| 2014/0206322 A1* | 7/2014 | Dimou | H04W 4/005 455/414.1 |
| 2014/0321452 A1* | 10/2014 | Choi | H04W 8/005 370/350 |
| 2015/0036578 A1* | 2/2015 | Wu | H04W 8/005 370/312 |
| 2015/0271861 A1* | 9/2015 | Li | H04W 76/023 455/426.1 |
| 2015/0282132 A1* | 10/2015 | Kim | H04W 8/005 370/329 |
| 2015/0334757 A1* | 11/2015 | Seo | H04W 76/023 370/329 |
| 2016/0095147 A1* | 3/2016 | Kim | H04W 8/005 370/329 |
| 2016/0142899 A1* | 5/2016 | Baek | H04L 47/11 370/230 |

OTHER PUBLICATIONS

International Search Report and Written Opinion—PCT/US2015/063501—ISA/EPO—Mar. 18, 2016.
Sendin-Rana P., et al., "Improving Management Performance of P2PSIP for Mobile Sensing in Wireless Overlays," Sensors, Nov. 2013, vol. 13 (11), pp. 15364-15384.

* cited by examiner

METHODS TO PREEMPTIVELY SEARCH AND SELECT LTE-DIRECT EXPRESSIONS FOR UNINTERRUPTED DEVICE-TO-DEVICE COMMUNICATION

TECHNICAL FIELD

The disclosure generally relates to preemptively searching and selecting LTE-Direct Expressions to maintain continuity in availing services via LTE-Direct and thereby support uninterrupted device-to-device (D2D) communication when a current LTE-Direct session experiences loss or degradation.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Exemplary cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for mobile phones and other terminals to communicate data at high speeds. LTE is based on GSM and includes contributions from various GSM-related protocols (e.g., Enhanced Data rates for GSM Evolution (EDGE)) and Universal Mobile Telecommunications System (UMTS) protocols (e.g., High-Speed Packet Access (HSPA)).

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). Accordingly, among other advantages, LTE-D can directly monitor for services on other LTE-D devices in a synchronous system and concurrently detect potentially thousands of services in proximity in a continuous and battery efficient manner.

LTE-D operates on licensed spectrum as a service to mobile applications and provides device-to-device (D2D) solution that enables service layer discovery. Mobile applications on LTE-D devices can instruct LTE-D to monitor for mobile application services on other devices and announce their own services at the physical layer for detection by services on other LTE-D devices, which allows the applications to be closed while LTE-D does the work—continuously—and notifies the client application when a match to the monitor that was set is detected.

Accordingly, LTE-D is an attractive alternative to mobile developers seeking to deploy proximate discovery solutions to extend their existing cloud services. LTE-D is a distributed discovery solution (versus the centralized discovery that exists today), whereby mobile applications may forego centralized database processing in identifying relevancy matches. Instead, relevance may be determined autonomously at the device level by transmitting and monitoring for relevant attributes. LTE-D offers certain benefits in relation to privacy as well as power consumption, in that LTE-D does not utilize perpetual location tracking to determine proximity. By keeping discovery on the device rather than the cloud, the user has more control over what information is shared with external devices.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to various aspects, a method for uninterrupted device-to-device communication may comprise establishing a first device-to-device connection with a first peer device to access a service shared by the first peer device, discovering at least one alternate peer device sharing the service shared by the first peer device while the first device-to-device connection is active, and establishing a second device-to-device connection with the at least one alternate peer device in response to loss or degradation of the first device-to-device connection.

According to various aspects, a wireless device may comprise one or more processors configured to establish a first device-to-device connection with a first peer device to access a service shared by the first peer device, discover at least one alternate peer device sharing the service shared by the first peer device while the first device-to-device connection is active, and establish a second device-to-device connection with the at least one alternate peer device in response to loss or degradation of the first device-to-device connection, and a memory coupled to the one or more processors.

According to various aspects, a wireless device may comprise means for establishing a first device-to-device connection with a first peer device to access a service shared by the first peer device, means for discovering at least one alternate peer device sharing the service shared by the first peer device while the first device-to-device connection is active, and means for establishing a second device-to-device connection with the at least one alternate peer device in response to loss or degradation of the first device-to-device connection.

According to various aspects, a computer-readable storage medium may have computer-executable instructions recorded thereon, wherein executing the computer-executable instructions on a wireless device may cause the wireless device to establish a first device-to-device connection with a first peer device to access a service shared by the first peer device, discover at least one alternate peer device sharing the service shared by the first peer device while the first device-to-device connection is active, and establish a second device-to-device connection with the at least one alternate peer device in response to loss or degradation of the first device-to-device connection.

Other objects and advantages associated with the various aspects and/or embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
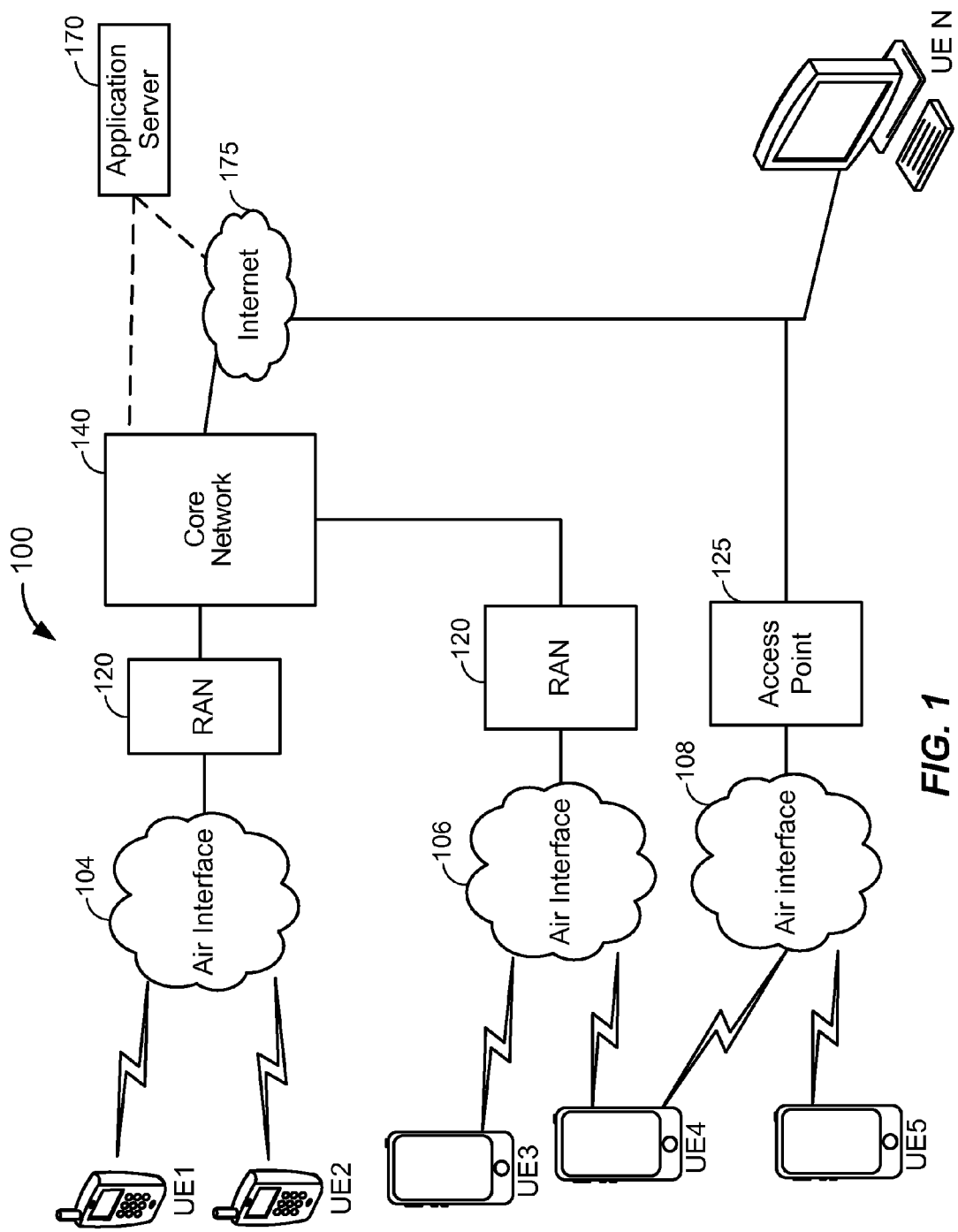
FIG. 1 illustrates a high-level system architecture of a wireless communications system, according to one aspect of the disclosure.

Various aspects are disclosed in the following description and related drawings to show examples directed to specific exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each aspect and/or embodiment described herein, the corresponding form of any such aspect and/or embodiment may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse traffic channel or a downlink/forward traffic channel.

FIG. 1 illustrates a high-level system architecture of a wireless communications system 100 according to one aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, Evolved Node Bs (eNodeBs or eNBs), and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., a Wi-Fi router with wired and/or wireless connectivity may correspond to the access point 125).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services for UEs that can connect to the application server 170 via the core network 140 and/or the Internet 175 (e.g., Voice-over-Internet Protocol (VoIP) sessions, Voice-over-LTE (VoLTE) sessions, Push-to-Talk (PTT) sessions, group communication sessions, sessions that involve Rich Communication Services (RCS) sessions, social networking services, etc.).

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
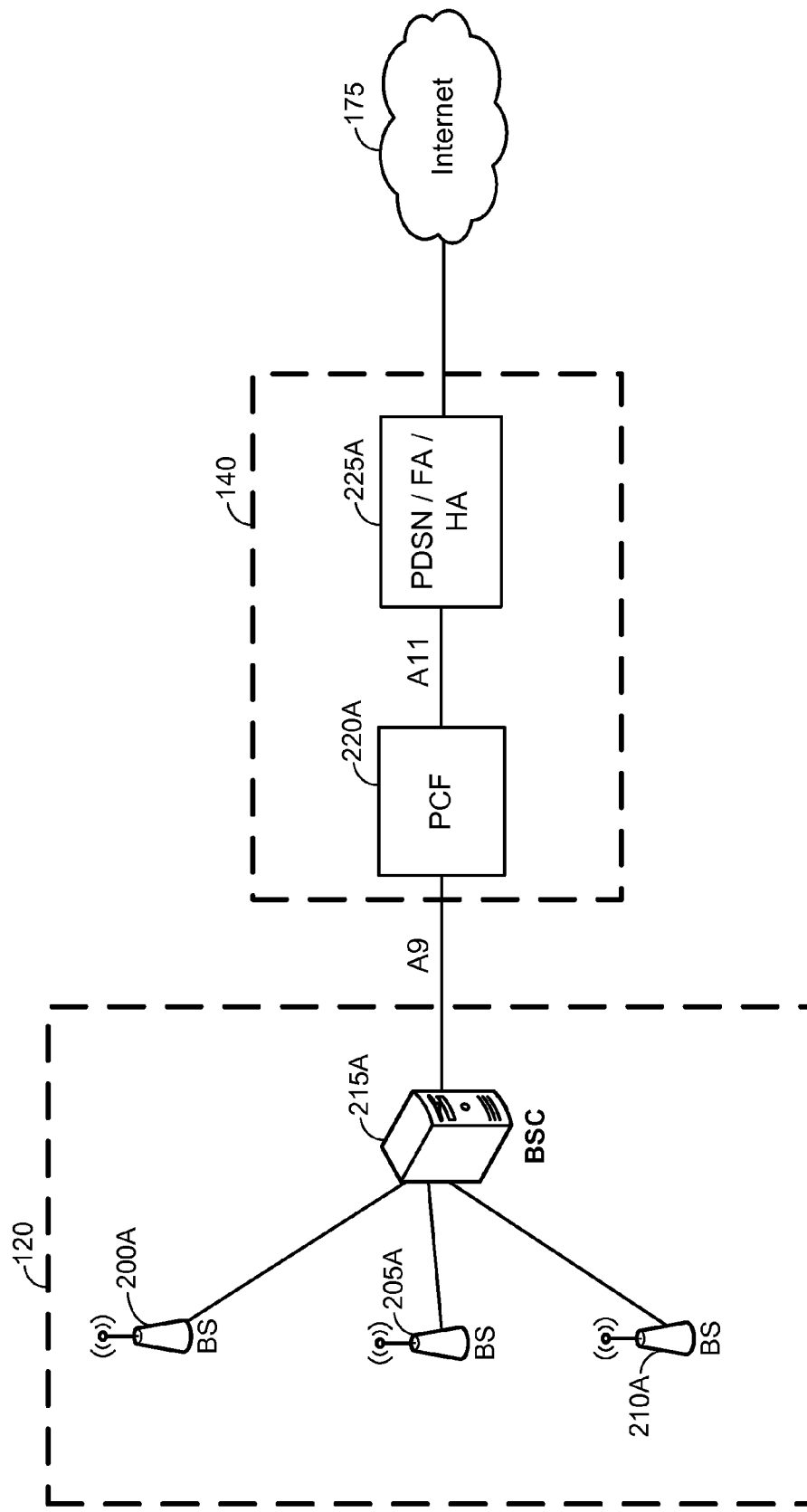
FIG. 2A illustrates an example configuration of a radio access network (RAN) and a packet-switched portion of a core network for a 1×EV-DO network, according to one aspect of the disclosure.

FIG. 2A illustrates an example configuration of the RAN 120 and the core network 140 for packet-switched communications in a CDMA2000 1× Evolution-Data Optimized (EV-DO) network according to one aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
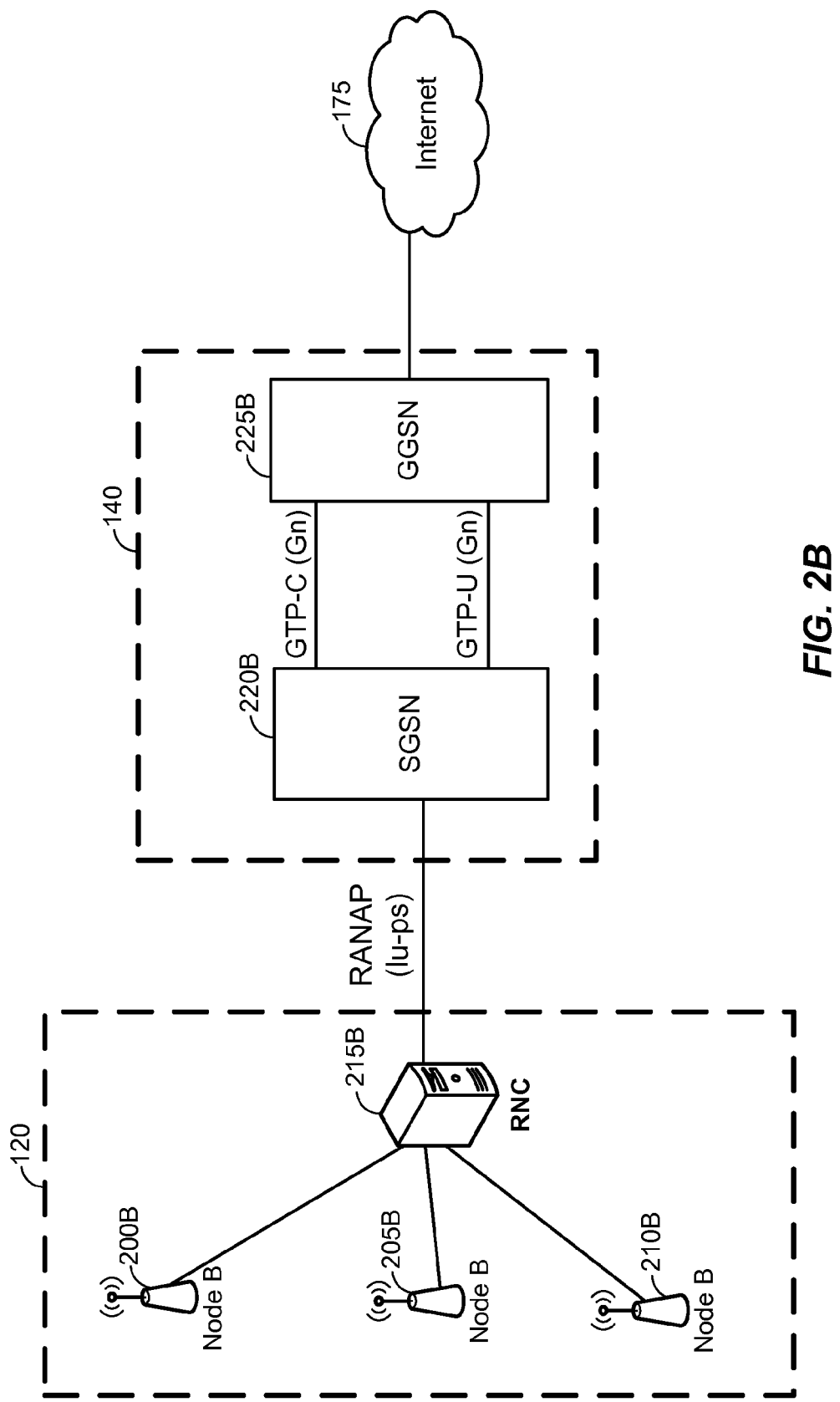
FIG. 2B illustrates an example configuration of the RAN and a packet-switched portion of a General Packet Radio Service (GPRS) core network within a 3G UMTS W-CDMA system, according to one aspect of the disclosure.

FIG. 2B illustrates an example configuration of the RAN 120 and a packet-switched portion of the core network 140 that is configured as a GPRS core network within a 3G UMTS W-CDMA system according to one aspect of the disclosure. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management, and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over an Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
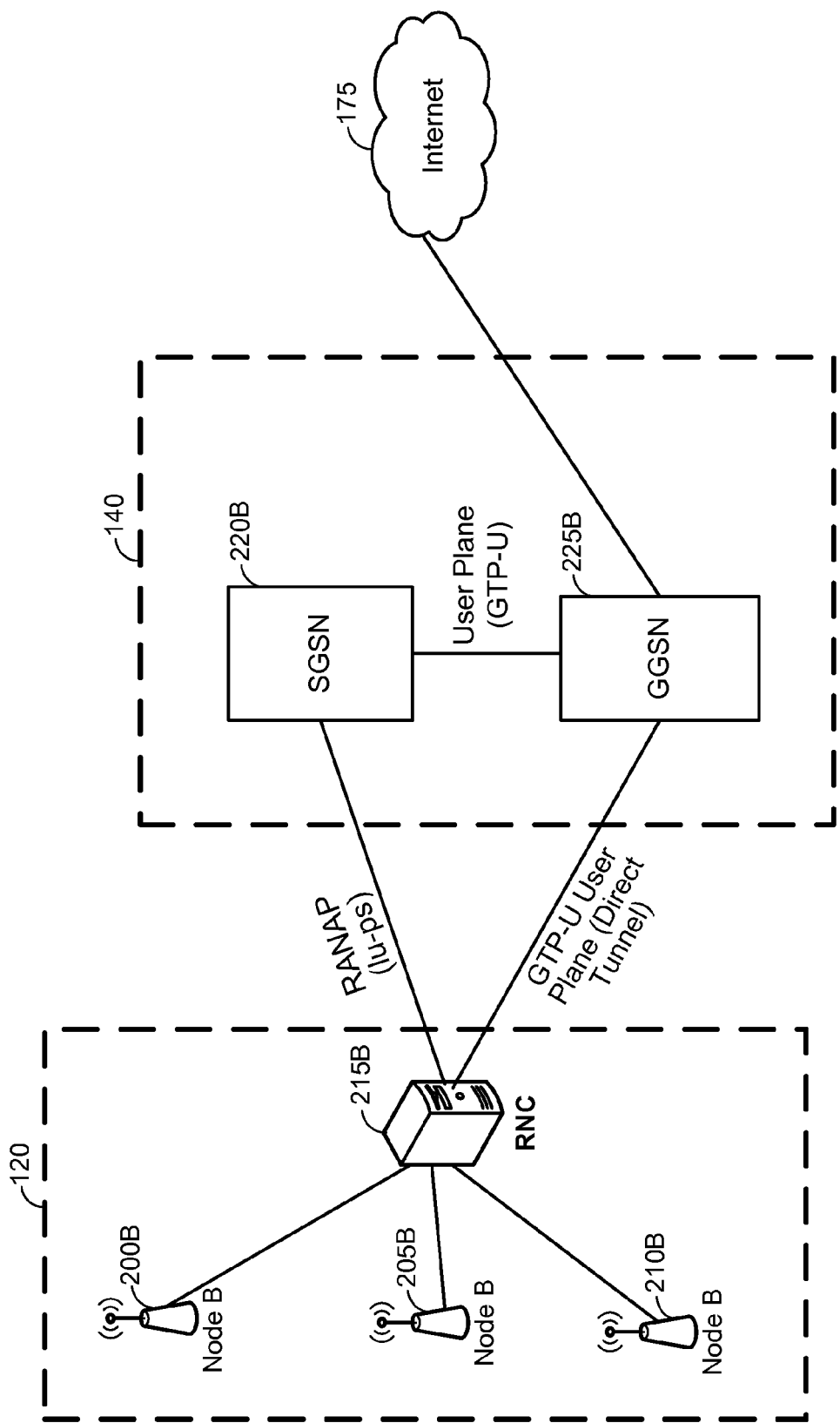
FIG. 2C illustrates another example configuration of the RAN and a packet-switched portion of a GPRS core network within a 3G UMTS W-CDMA system, according to one aspect of the disclosure.

FIG. 2C illustrates another example configuration of the RAN 120 and a packet-switched portion of the core network 140 that is configured as a GPRS core network within a 3G UMTS W-CDMA system according to one aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e., the PDP context is preserved) the GTP-U tunnel is established between the GGSN 225B and SGSN 220B in order to be able to handle the downlink packets.

Figure 2D:
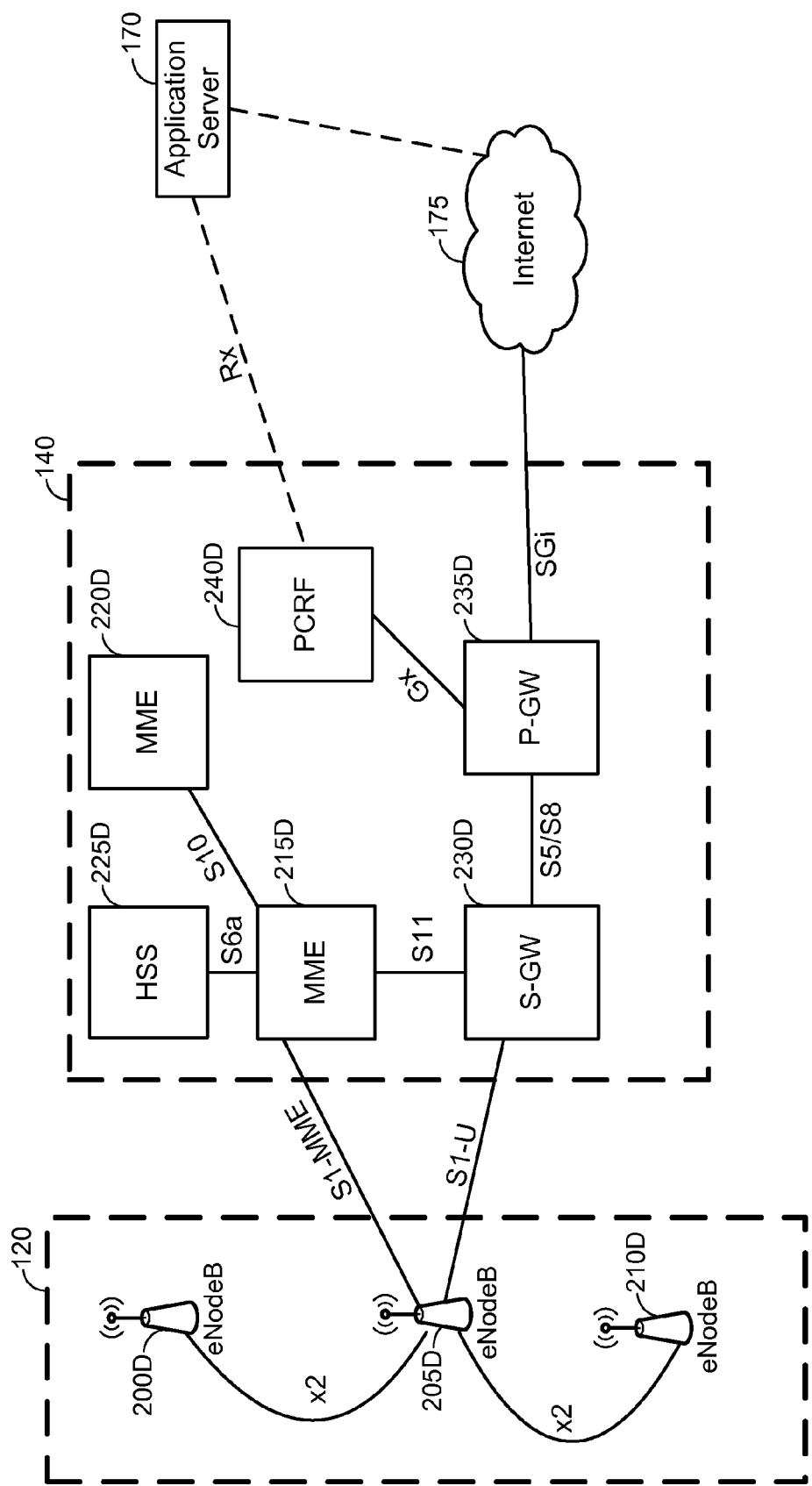
FIG. 2D illustrates an example configuration of the RAN and a packet-switched portion of the core network that is based on an Evolved Packet System (EPS) or Long Term Evolution (LTE) network, according to one aspect of the disclosure.

FIG. 2D illustrates an example configuration of the RAN 120 and a packet-switched portion of the core network 140 based on an Evolved Packet System (EPS) or LTE network, according to one aspect of the disclosure. Referring to FIG. 2D, unlike the RAN 120 shown in FIGS. 2B-2C, the RAN 120 in the EPS/LTE network is configured with a plurality of eNodeBs 200D, 205D and 210D, without the RNC 215B from FIGS. 2B-2C. This is because eNodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. The PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g., UMTS PS domain/GPRS domain resources/LTE PS data services). One example of an application function is the Proxy-Call Session Control Function (P-CSCF) of the IP Multimedia Subsystem (IMS) Core Network subsystem. The AF uses the Rx reference point to provide session information to the PCRF 240D. Any other application server offering IP data services over cellular network can also be connected to the PCRF 240D via the Rx reference point.

Figure 2E:
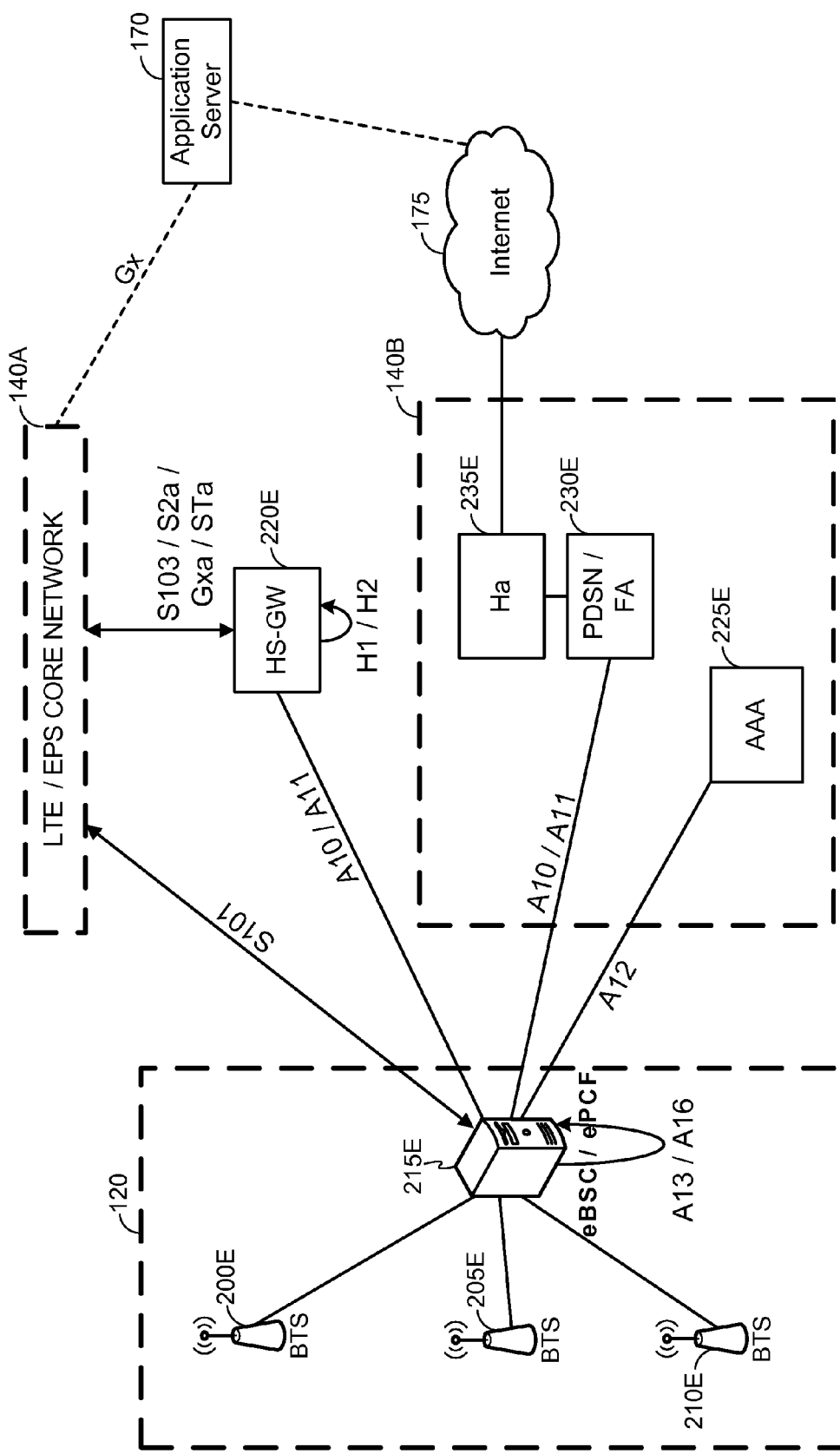
FIG. 2E illustrates an example configuration of an enhanced High Rate Packet Data (HRPD) RAN connected to an EPS or LTE network and also a packet-switched portion of an HRPD core network, according to one aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B, according to one aspect of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
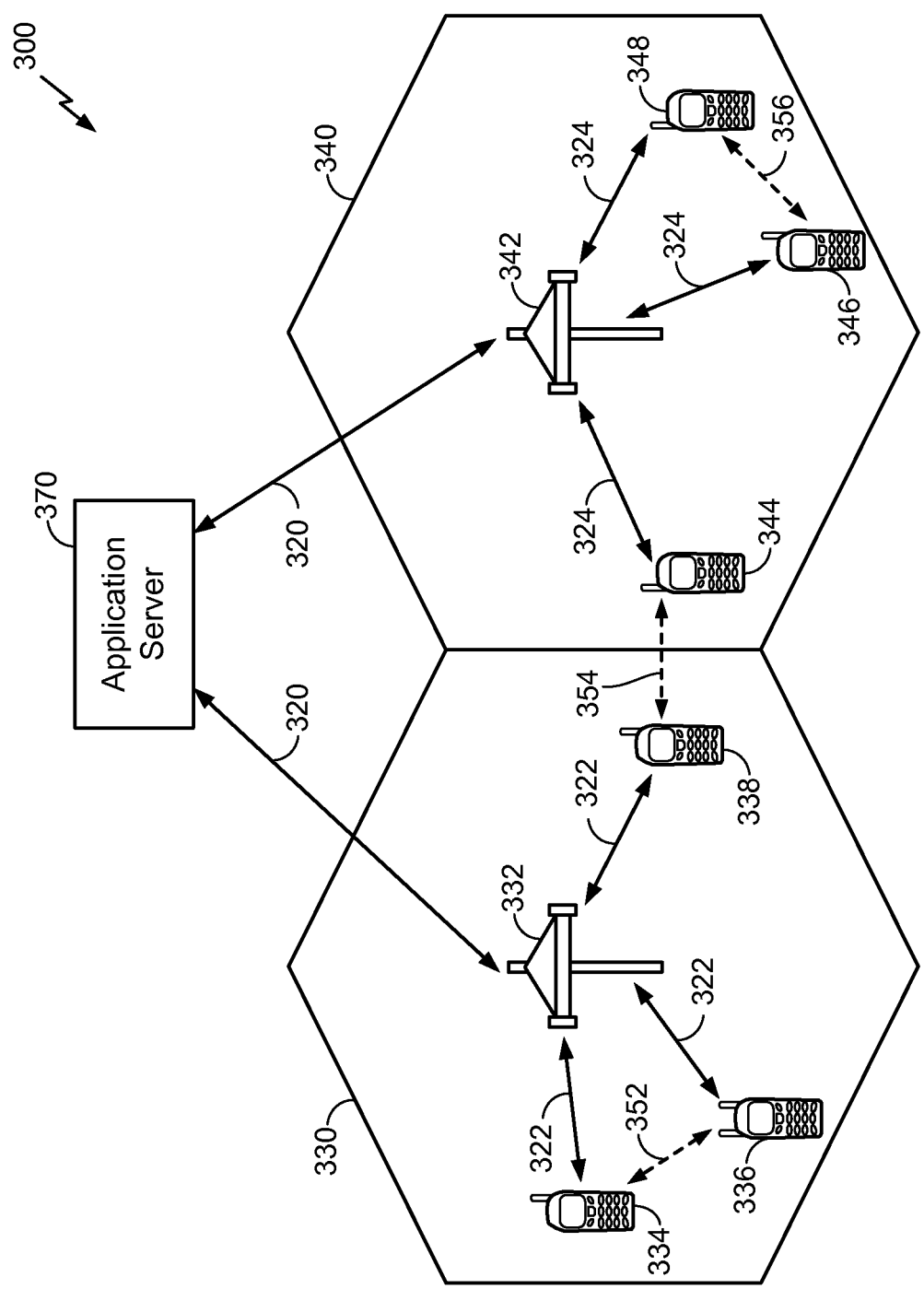
FIG. 3 illustrates an exemplary wireless communications system in which certain devices may communicate over a network infrastructure and/or over a direct device-to-device (D2D) connection, according to one aspect of the disclosure.

According to one aspect of the disclosure, FIG. 3 illustrates an exemplary wireless communications system 300 in which certain devices may communicate over a direct device-to-device (D2D) connection using peer-to-peer (P2P) technologies (e.g., LTE Direct (LTE-D), Wi-Fi Direct (WFD), Bluetooth, etc.) while also connecting to a Wireless Wide Area Network (WWAN) or other network infrastructure (e.g., an LTE network). Referring to FIG. 3, an application server 370 (e.g., the application server 170 in FIG. 1, FIG. 2D, FIG. 2E, etc.) is connected to a first cell 330 having a first base station 332, a second cell 340 having a second base station 342, and the application server 370 coupled to the first base stations 332 and the second base station 342 via a network link 320 (e.g., the Rx link of FIG. 2D, the Gx link of FIG. 2E, etc.). The coverage area of a given base station is represented by the cell in which the given base station is located, whereby for purposes of discussion, the first cell 330 includes the coverage area corresponding to the first base station 332 and the second cell 340 includes the coverage area corresponding to the second base station 342. Each the cells 330, 340 in the wireless communications system 300 include various UEs that communicate with the respective base stations 332, 342 and with the application server 370 via the respective base stations 332, 342. For example, in the embodiment illustrated in FIG. 3, the first cell 330 includes UE 334, UE 336, and UE 338, while the second cell 340 includes UE 344, UE 346, and UE 348, wherein one or more of the UEs in the wireless communications system 300 may be mobile or other wireless devices. Although not shown in FIG. 3, in some embodiments the base stations 332, 342 may be connected to one another via a backhaul link.

In accordance with various exemplary embodiments described herein, one or more of UE 334, UE 336, UE 338, UE 344, UE 346, and UE 348 may support direct (or D2D) P2P communications, whereby such UEs may support communicating with one another directly without having to communicate through another device or a network infrastructure element such as the first base station 332 and the second base station 342 and also support communications through the network infrastructure elements such as the first base station 332 and/or the second base station 342. In communications that involve network infrastructure, signals may generally be transmitted and received through uplink and downlink connections between various UEs and the base stations 332, 342, such as link 322 in the first cell 330 and link 324 in the second cell 340. Each of the base stations 332, 342 generally serve as the attachment point for the UEs in the corresponding cells 330, 340 and facilitate communications between the UEs served therein. In accordance with one aspect, when two or more UEs, such as UE 334 and UE 336, wish to communicate with one another and are located in sufficient proximity to each other, then a direct P2P link 352 can be established therebetween, which may offload traffic from the base station 332 serving the UEs 334, 336, allow UEs 334, 336 to communicate more efficiently, or provide other advantages that will be apparent to those skilled in the art.

As shown in FIG. 3, the UE 346 can communicate with UE 348 through intermediate base station 342 via link 324, and UEs 346, 348 may further communicate via a P2P link 356. Furthermore, for inter-cell communications where the participating UEs are in different nearby cells, a direct P2P communications link is still a possibility, which is illustrated in FIG. 3 where UE 338 and UE 344 may communicate using direct P2P communications illustrated by dashed link 354.

LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity. LTE-D has a wider range than other D2D P2P technologies, such as Wi-Fi Direct (WFD) or Bluetooth.

LTE-D operates on licensed spectrum as a service to mobile applications. LTE-D is a device-to-device (D2D) solution that enables service layer discovery and also D2D communication. Mobile applications on LTE-D devices can instruct LTE-D to monitor for mobile application services on other devices and announce their own services (for detection by services on other LTE-D devices) at the physical layer, which allows the applications to close while LTE-D does the work—continuously—and notifies the client application when a match to a "monitor" established by an associated application is detected. For example, the application can establish a monitor for "tennis events" and the LTE-D discovery layer can wake-up the application when a tennis-related LTE-D message is detected.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

LTE-D relies upon "Expressions" for both discovery of proximate peers and facilitating communication between proximate peers. Expressions at the application layer and/or the service layer are referred to as "Expression Names" (e.g., ShirtSale@Gap.com, Jane@Facebook.com, etc.), wherein Expression Names at the application layer and/or the service layer are mapped to bit-strings at the physical layer that are referred to as "Expression Codes". In an example, each Expression Code can have a length of 192 bits (e.g., "11001111 . . . 1011", etc.). As will be appreciated, any reference to a particular Expression can refer to the Expression's associated Expression Name, Expression Code, or both, depending on context, and furthermore, Expressions can be either Private or Public based on the mapping type. Public Expressions are made public and can be identified by any application, whereby Private Expressions are targeted for specific audiences.

Discovery in LTE-D operates in a synchronous manner based on parameters that are configured by the LTE network itself. For example, frequency division duplexing (FDD) and/or time division duplexing (TDD) may be assigned by a serving eNode B via a Session Information Block (SIB). The serving eNode B can also configure an interval at which LTE-D devices to are announce themselves (e.g., every 20 seconds, etc.) via transmission of a Service Discovery (or P2P Discovery) message. For example, for a 10 MHz FDD system, the eNode B can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

In at least one embodiment, after two or more LTE-D devices discover each other and wish to establish an LTE-D session for communication, the LTE network may be required to authorize establishment of the LTE-D session, referred to herein as network assisted connection setup. If the LTE network authorizes the LTE-D session, the actual media is exchanged via D2D communication between the LTE-D devices, wherein peer LTE-D capable devices use Expressions to discover proximate services, applications, and context and establish direct communications in an efficient manner.

Figure 4:
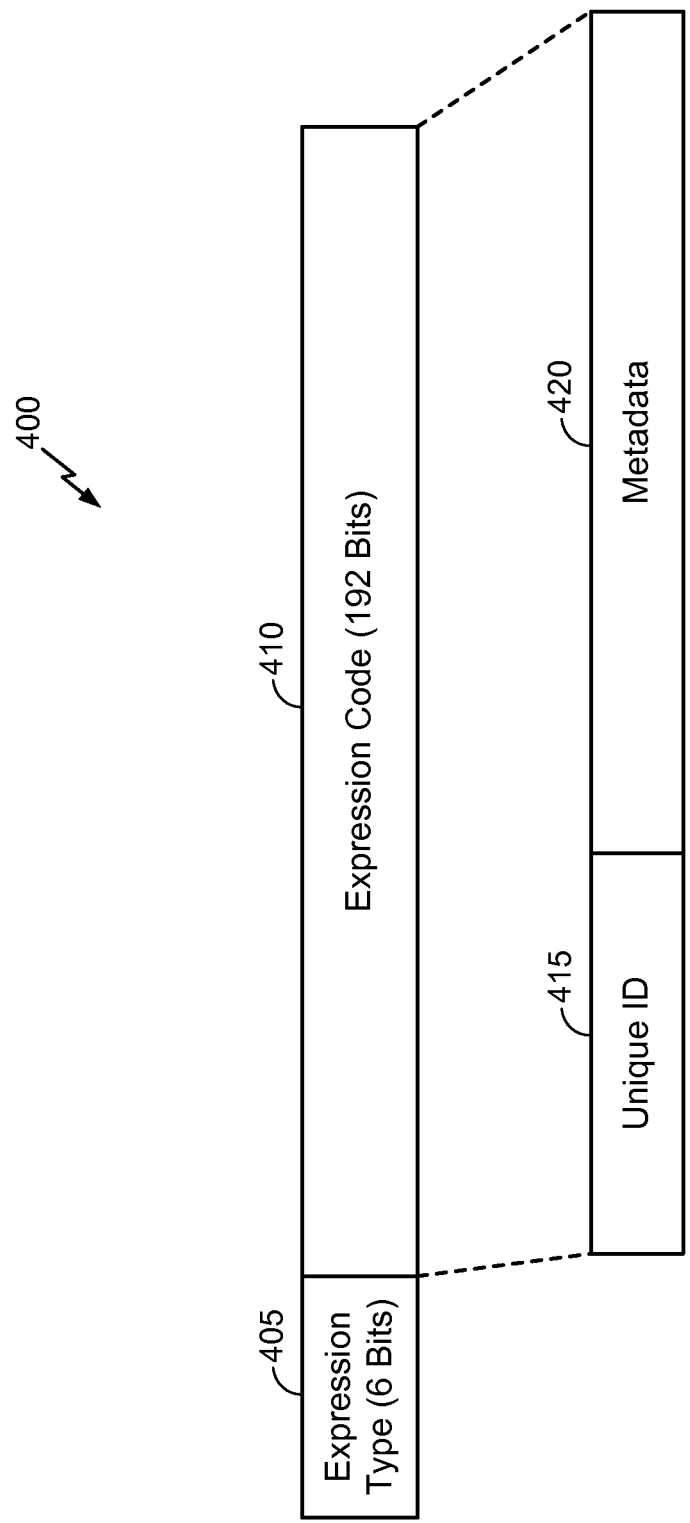
FIG. 4 illustrates an exemplary LTE-Direct (LTE-D) Expression, according to one aspect of the disclosure.

For example, according to one aspect of the disclosure, FIG. 4 illustrates an exemplary LTE-Direct (LTE-D) Expression 400 that am LTE-D capable device may broadcast and/or discover at periodic intervals (e.g., every twenty (20) seconds). As shown in FIG. 4, the LTE-D Expression 400 may include a six-bit Expression Type field 405, and a 192-bit Expression Code field 410, wherein the 192-bit Expression Code field 410 may further include a Unique Identifier 415 associated with a particular LTE-D device that broadcasted the Expression and one or more metadata fields 420 that can include various types of data, such as services and/or applications that the broadcasting LTE-D device may be willing to share with other LTE-D capable devices in proximity. For example, a business establishment in a locality may offer entertainment broadcast services, such as music streaming, to consumers via LTE-D. In that context, an LTE-D device located in the business establishment may broadcast shareable music as "shares" using LTE-D Expressions. In that context, an LTE-D Expression 400 broadcasting shareable music may include an Expression Type 405 to indicate that the LTE-D Expression 400 relates to a shared service, and the metadata field 420 may include information to identify the particular music that is offered for sharing (e.g., 'Artist: Album name' {Share: Justin Timberlake, Beyonce|Share: Jazz, Electronic, etc.}).

Figure 5A:
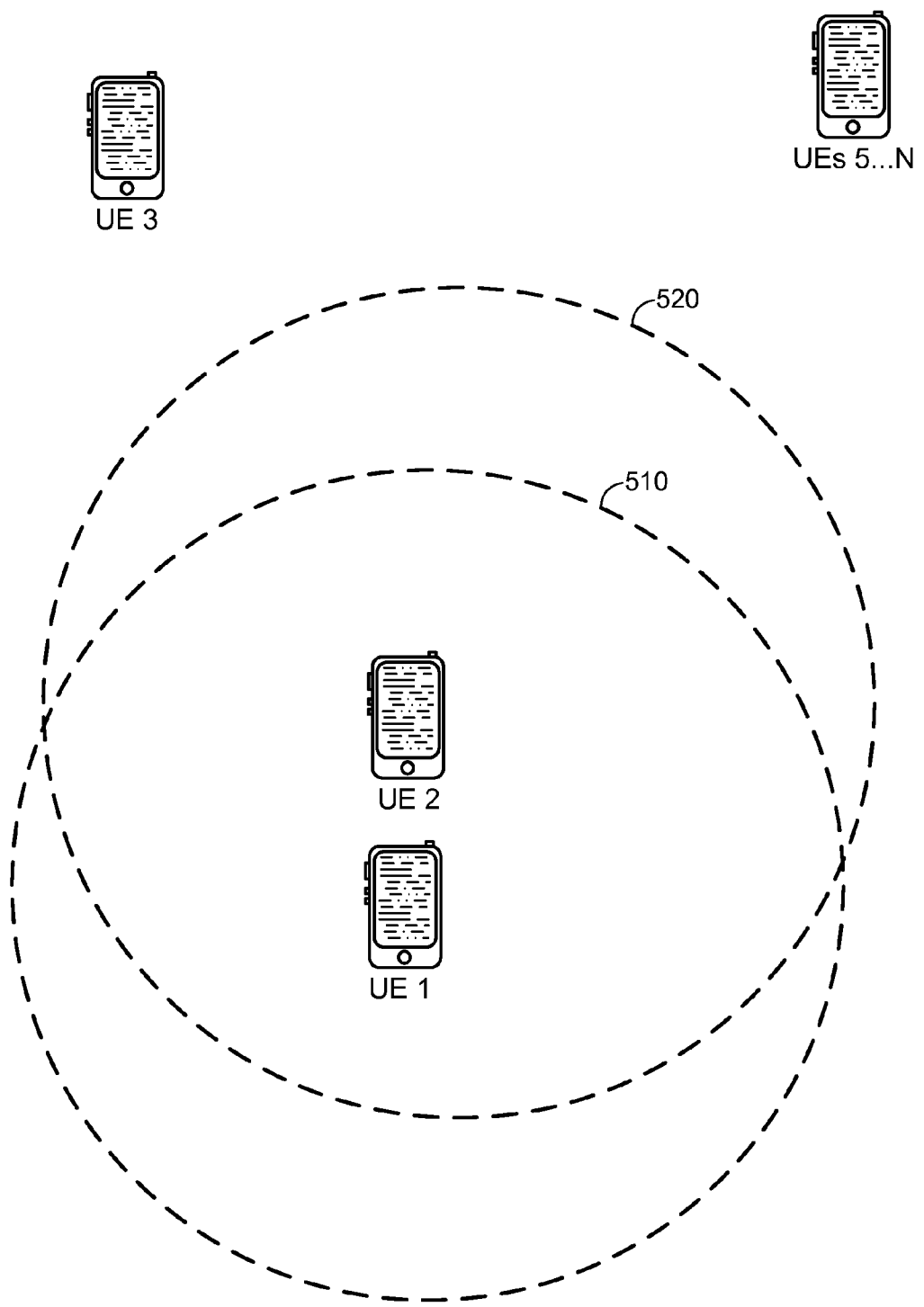
FIGS. 5A-5C illustrate exemplary wireless communications system in which one or more devices communicating over an LTE-D connection may preemptively search and select LTE-D Expressions for uninterrupted D2D communication, according to one aspect of the disclosure.
Figure 5B:
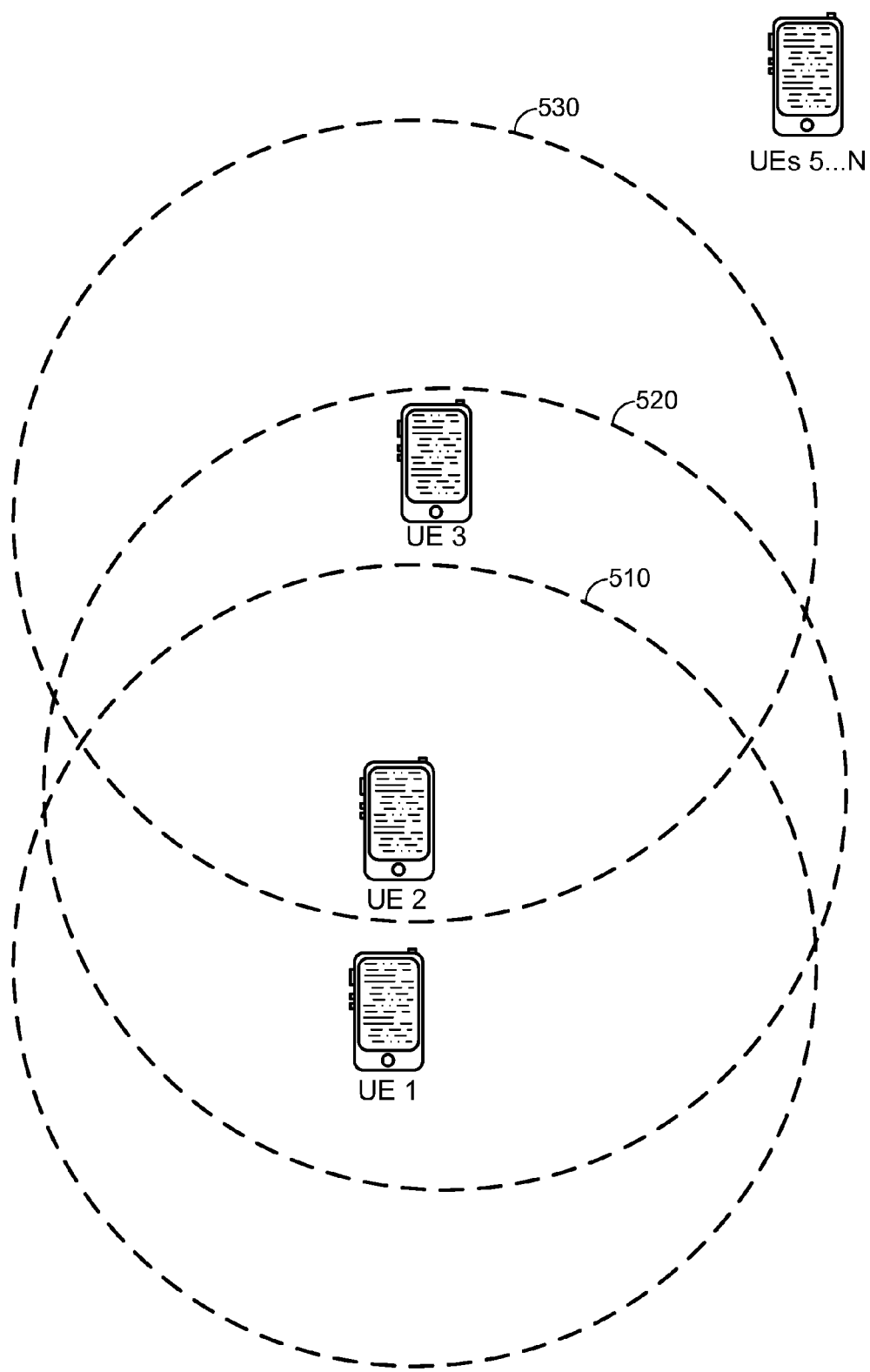
Figure 5C:
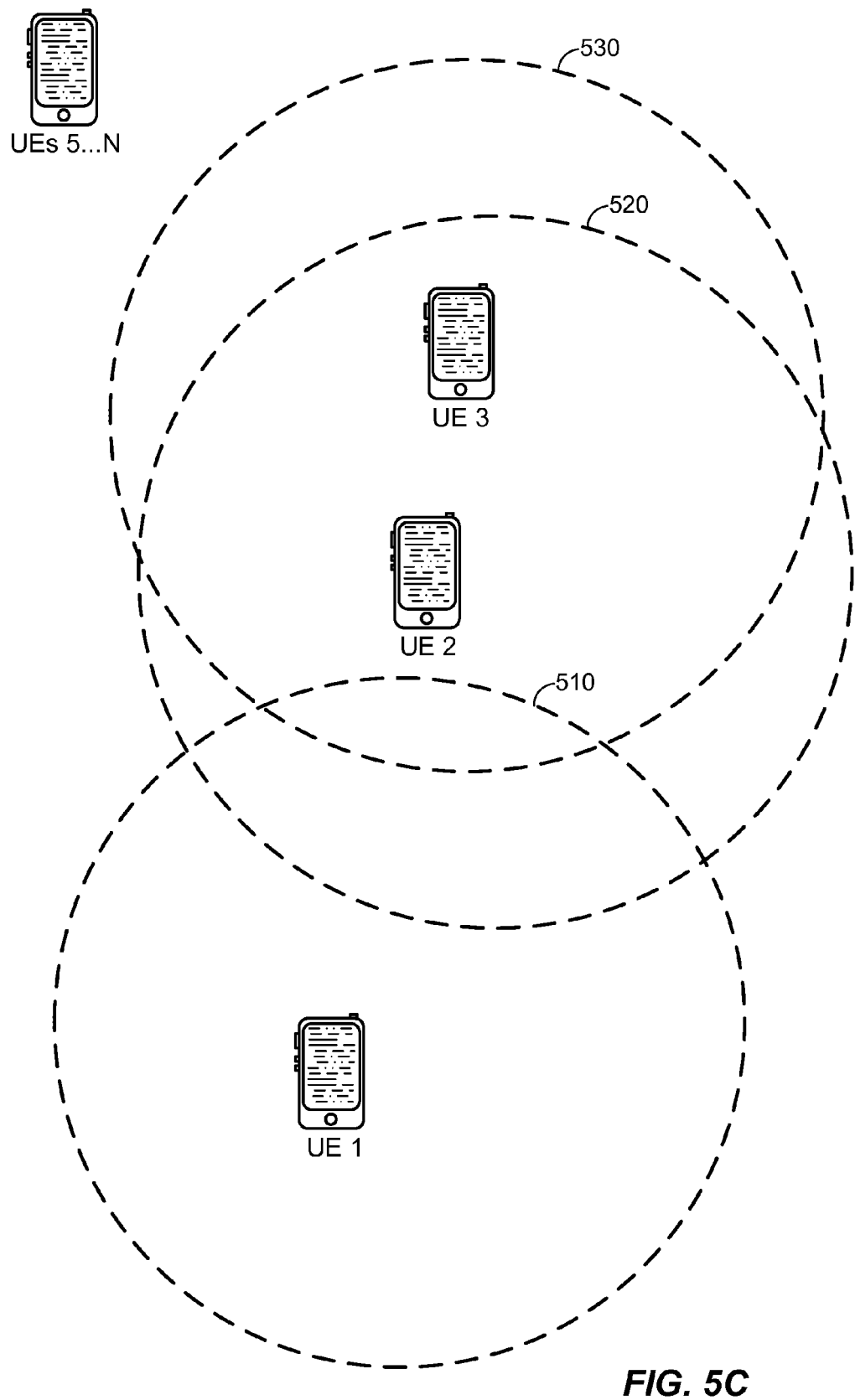

In a D2D communication context, a device having D2D communication capabilities may generally only discover other devices within a coverage area that the device supports, wherein the device may then use D2D communication to exchange information and/or other data with other D2D capable devices in proximity that are discovered due to falling within the coverage area that the device supports. Accordingly, D2D communications may generally depend on the coverage that each D2D capable device supports. For example, according to one aspect of the disclosure, FIGS. 5A-5C illustrate exemplary wireless communications systems in which one or more devices may communicate over a D2D connection. More particularly, referring to FIG. 5A, initially assume that UEs 1 . . . N are arranged as shown therein, wherein UE 1 supports a first coverage area (or discovery region) 510 and can therefore detect other devices inside the coverage area 510 using a particular P2P technology (e.g., LTE-D, WFD, Bluetooth, etc.). Furthermore, as shown in FIG. 5A, UE 2 supports a second coverage area 520 and can therefore detect other devices inside the coverage area 520 using the particular P2P technology. In the use case shown in FIG. 5A, UE 2 falls within the coverage area 510 that UE 1 supports and UE 1 likewise falls within the coverage area 520 that UE 2 supports, whereby UE 1 and UE 2 are in sufficient proximity to discover one another. On the other hand, UE 3 and UEs 5 . . . N are outside the coverage area 510 and 520 such that UE 1 and UE 2 cannot detect UE 3 and UEs 5 . . . N, and in a similar respect, UE 3 and UEs 5 . . . N cannot detect UE 1 and UE 2.

In one embodiment, consider an example where a user associated with UE 2 may be interested in hearing a particular album from a particular artist that UE 1 may be sharing via LTE-D or another suitable D2D technology. In that case, UE 1 may be assumed to periodically broadcast an Expression indicating the music share within coverage area 510, and UE 2 may periodically search for Expressions that match the music in which the user is interested in hearing within coverage area 520. Accordingly, UE 2 may detect the Expression because UE 1 and UE 2 are located within each other's respective coverage areas 510, 520, whereby UE 2 may establish a streaming session with UE 1 using LTE-D or other suitable D2D technology. However, because devices can only communicate D2D with other devices within the coverage area that the devices support, UE 2 may only enjoy satisfactory music quality while in the coverage area 510 associated with peer UE 1 that may be sharing the music. As such, due to mobility, bad channel conditions, or other factors, UE 2 may experience loss or degradation in receiving the music streaming service from peer UE 1. Furthermore, even if there are additional relay nodes or other peers willing to share the same content, UE 2 would have to wait until the next discovery cycle (e.g., approximately twenty seconds) to search for interesting Expressions to again start streaming the music. For example, referring to FIG. 5B, UE 3 having a coverage area 530 may be sharing the same content as UE 1 is sharing within coverage area 510. Furthermore, referring to FIG. 5C, the D2D connection between UE 1 and UE 2 may become degraded or lost at some point in time due to UE 2 moving outside the coverage area 510 associated with UE 1. Accordingly, even though UE 3 may be willing to share the same content, UE 2 would have to wait until the next discovery cycle after the D2D connection with UE 1 became degraded or lost before searching for interesting Expressions and resuming the music stream from UE 3.

Accordingly, the following description provides various exemplary methods to maintain continuity in availing services via LTE-D or other suitable D2D technologies, which may generally involve preemptively searching and selecting Expressions based on user interest and attempting to reestablish a D2D link when a current session unexpectedly degrades or stops. In particular, in each discovery cycle, a UE seeking to avail services from peer UEs via D2D communication may maintain and refresh a list that contains Expressions matching services in which the UE may be interested, wherein the list may be ordered according to various criteria and used to find a peer to reestablish a lost or degraded session seamlessly, or at least in less time than would be required if the UE had to wait until a next discovery cycle after the session was lost or degraded before starting to search for and/or select alternate peers. For example, in one embodiment, the list containing the interesting Expressions may be sorted to order most recent/currently active Expressions first, according to a predefined users interest list, according to decreasing signal strengths, and/or in other ways to ensure that the best possible peer will be used in the attempt to reestablish the link (e.g., attempting to reestablish the link with the current peer and then attempting to reestablish the link with a currently active peer having the highest received signal strength if the attempt to reestablish the link with the current peer fails).

Furthermore, various conditions may be defined to trigger preemptively searching and/or selecting other Expressions in which the user may have interest. For example, in various embodiments, the triggering condition may include a downlink power threshold value ($P_D$) and/or an uplink power threshold value ($P_U$), wherein the preemptive search and/or selection may be triggered in response to a received power on the downlink becoming less than the threshold value $P_D$ and/or a transmit power used on the uplink exceeding the threshold value $P_U$. Alternatively, in on embodiment, the triggering condition may occur after receiving a predefined number of negative acknowledgments (NACKs) that may indicate bad channel conditions on the uplink and/or the downlink. In a further alternative, a proactive search to discover similar Expressions to a current Expression can be carried out at every discovery cycle and/or at periodic intervals after the current Expression was selected. Moreover, in one embodiment, the preemptive search may utilize various search criteria or other algorithms, which may include a closest lexical match to the current (active) Expression, a user's predefined interest (e.g., preferred music genres), and/or any other suitable search criteria, as will be apparent.

Figure 6:
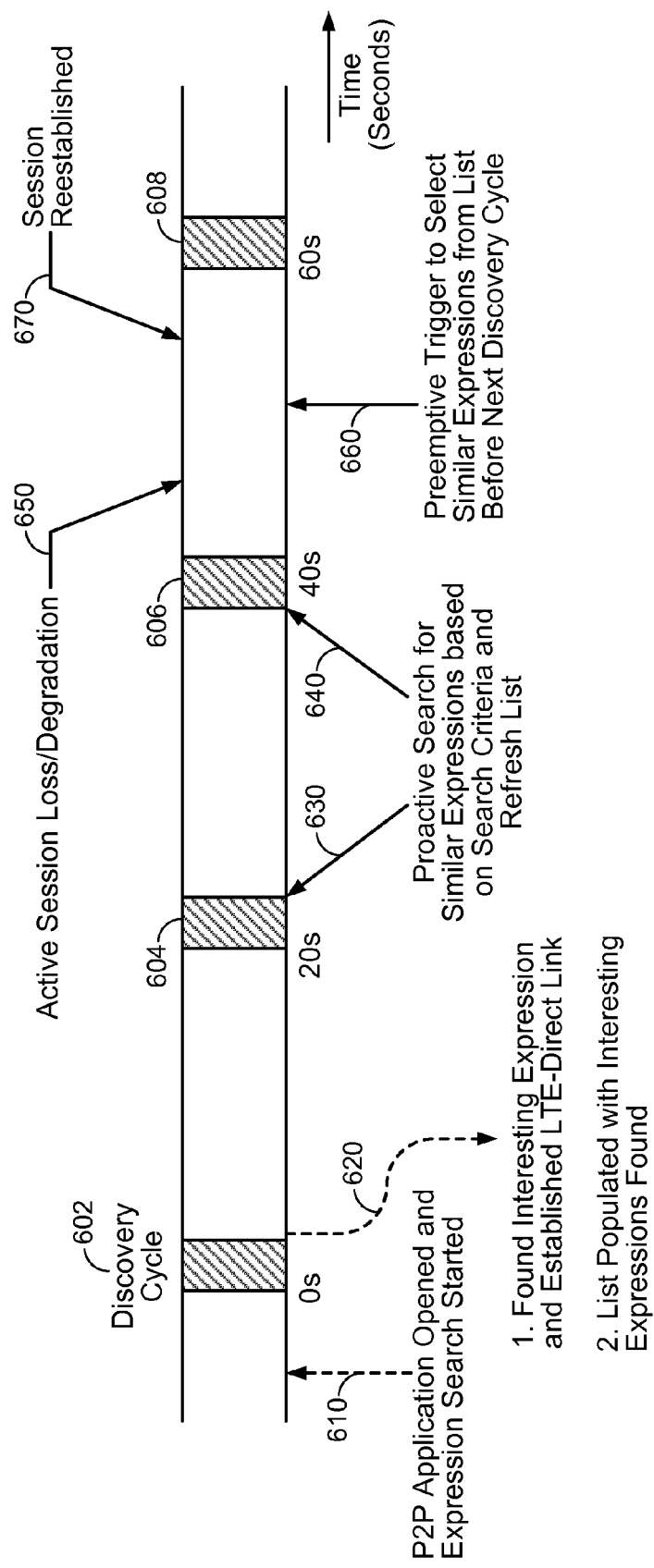
FIG. 6 illustrates an exemplary timeline in which an LTE-D capable device may preemptively search and select LTE-D Expressions to maintain uninterrupted D2D communication in the event that a current LTE-D session may experience loss or degradation, according to one aspect of the disclosure.

More particularly, according to one aspect of the disclosure, FIG. 6 illustrates an exemplary timeline in which an LTE-D capable device may preemptively search and select LTE-D Expressions to maintain uninterrupted D2D communication in the event that a current LTE-D session may experience loss or degradation, wherein the timeline shown in FIG. 6 will be described in context with the exemplary wireless communications systems shown in FIGS. 5A-5C. In one embodiment, referring to FIG. 6, UE 2 may initially open a peer-to-peer (P2P) application that supports D2D communication and start an Expression search at 610. Accordingly, UE 2 may discover one or more interesting expressions during discovery cycle 602, wherein the interesting Expressions discovered during discovery cycle 602 may include at least the Expression broadcasted from UE 1 within coverage area 501. In one embodiment, at 620, UE 2 may establish an LTE-D link to initiate a D2D communication session with UE 1 and further populate the list with the interesting Expressions that were discovered in discovery cycle 602. In one embodiment, UE 2 may then use one or more subsequent discovery cycles 604, 606, etc. to preemptively search for other Expressions that are similar to the current Expression (i.e., the Expression used to establish the D2D session with UE 1). Accordingly, at 630 and 640, UE 2 may conduct the proactive search for similar Expressions based on one or more search criteria and refresh the list that was initially populated at 620, wherein the proactive searches at 630 and 640 may occur even though there may not have been any loss or degradation in the D2D link that was established with UE 1 at 620. Alternatively, the proactive searches need not be conducted in consecutive discovery cycles because the proactive search operation may be power consuming. Accordingly, in some use cases, the proactive searches may be based on an alternative power saving pattern (e.g., every other discovery cycle).

In any event, following each proactive search, the list may be refreshed and ordered according to user preferences, decreasing signal strengths, most recent, and/or other criteria. Accordingly, in context with FIG. 5B, suppose that UE 2 conducts the proactive search during discovery cycle 604 and/or discovery cycle 606, in which case UE 2 may discover the similar Expression that UE 3 broadcasted within coverage area 530, whereby the list may be refreshed at 630 and/or 640 to include the similar Expression discovered from UE 3. In one embodiment, supposing that the active session with UE 1 becomes lost or degraded at 650, a preemptive trigger may cause UE 2 to select a similar Expression from the current list at 660, which may occur prior to a next discovery cycle 608 after the active session was lost or degraded. For example, referring to FIG. 5C, the active session with UE 1 may become degraded as UE 2 towards the edge of coverage area 510 and/or lost after UE 2 moves outside coverage area 510. Accordingly, the trigger to select an alternate peer may occur at 660 once UE 2 detects that the active session with UE 1 has become lost or degraded (e.g., because a received downlink power dropped below a threshold value $P_D$, an uplink transmit power used to communicate with UE 1 on an uplink exceeded a threshold value $P_U$, UE 2 receives a predefined number of NACKs that may indicate bad channel conditions on the uplink and/or the downlink, etc.). As such, rather than starting to search for and/or select an alternate peer in the next discovery cycle 608 after the active session loss or degradation, UE 2 may use the similar Expressions in the list that was refreshed at 630 and/or 640 to reestablish the link (e.g., with UE 3) at 670 (e.g., without conducting a search following the loss or degradation of the initial session), thereby ensuring continuity in the LTE-D session and quick recovery from out-of-service scenarios.

Figure 7:
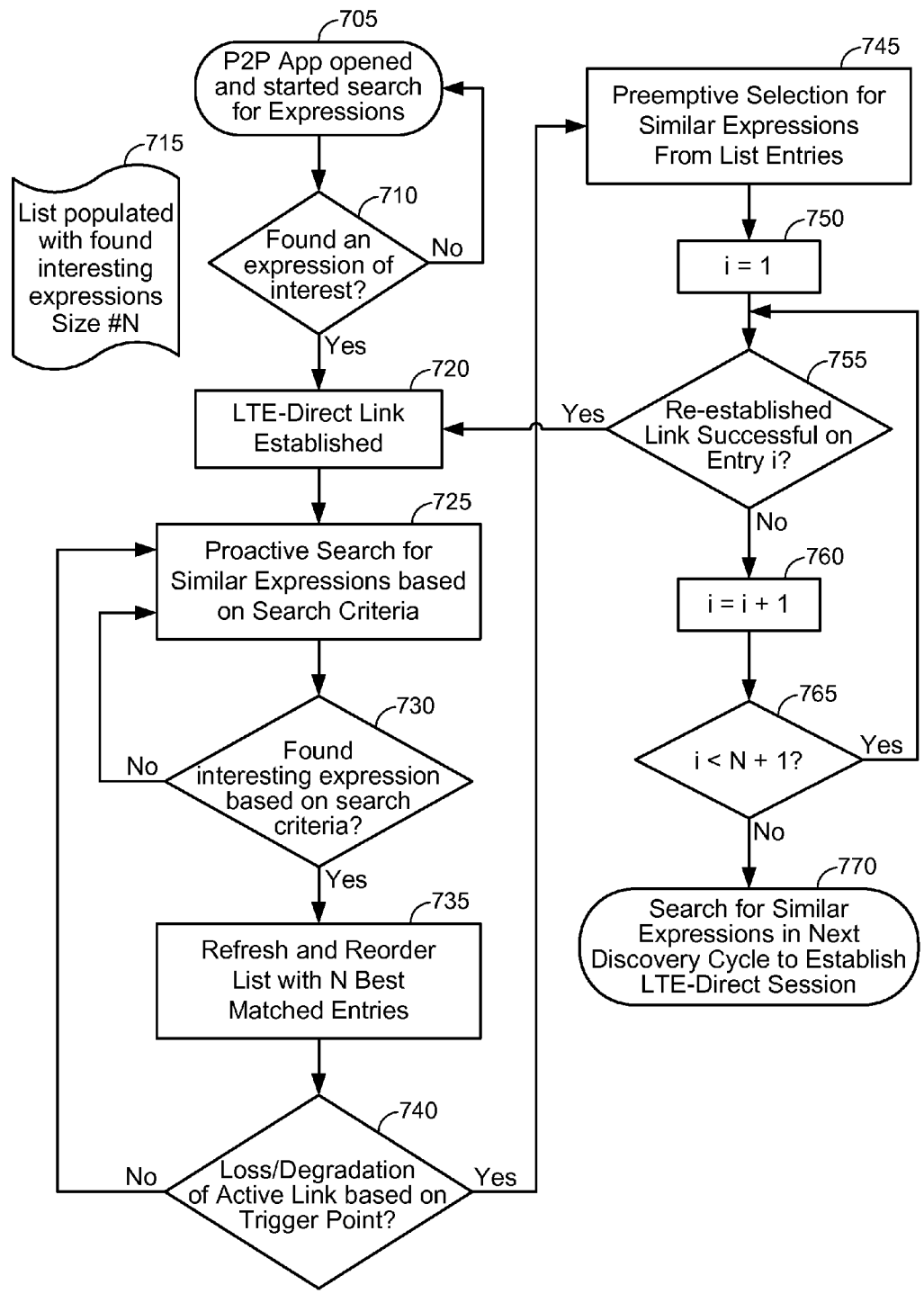
FIG. 7 illustrates an exemplary method in which an LTE-D capable device may preemptively search and select LTE-D Expressions to maintain uninterrupted D2D communication in the event that a current LTE-D session may experience loss or degradation, according to one aspect of the disclosure.

According to one aspect of the disclosure, FIG. 7 illustrates an exemplary method in which an LTE-D capable device may preemptively search and select LTE-D Expressions to maintain uninterrupted D2D communication in the event that a current LTE-D session may experience loss or degradation, wherein the method shown in FIG. 7 may generally correspond to the timeline shown in FIG. 6. In particular, at 705, a UE may initially open a P2P application that supports D2D communication and start an Expression search. Accordingly, the UE may determine whether any interesting Expressions were found at 710 and repeat the search at 705 in response to determining that no interesting Expressions were found. Otherwise, in response to determining that at least one interesting expression was found, the UE may populate the list with the interesting Expressions that were discovered at 715 and establish an LTE-D link to initiate a D2D communication session with at least one peer UE from the list at 720.

In one embodiment, at 725, the UE may then use one or more subsequent discovery cycles to proactively search for other Expressions that are similar to the active Expression that was used to establish the LTE-D link at 720. Accordingly, at 725, the UE may conduct the proactive search based on one or more search criteria and determine whether one or more interesting expressions matching the search criteria were found at 730. In one embodiment, in response to determining that no similar Expressions matching the search criteria were found, the UE may continue to conduct the proactive searches at 725 during subsequent discovery cycles (e.g., during each discovery cycle, every other discovery cycle, or according to other patterns). However, in the event that the UE determines that one or more similar Expressions matching the search criteria were found, the UE may refresh the list to include the N best matching Expressions and reorder the refreshed list according to appropriate criteria.

In one embodiment, the UE may further monitor the active session at 740 to detect whether the active session has become lost or degraded. For example, at 740, the UE may determine whether a received power on a downlink from the active peer dropped below a threshold value $P_D$, whether a transmit power used to communicate with the active peer on an uplink exceeded a threshold value $P_U$, whether a predefined number of NACKs that indicate bad channel conditions on the uplink and/or the downlink were received, and/or whether other suitable information indicates that the active session may have been lost and/or degraded. As such, in response to determining that the active session was lost or degraded, the UE may start a preemptive selection process at 745 based on the similar Expressions contained in the list. More particularly, at 750, the UE may set a counter i to one (1) and then determine whether an attempt to reestablish the lost and/or degraded session with entry i succeeded at 755. In response to determining that the link was successfully reestablished with entry i, the method may resume from 720. Otherwise, the UE may increment the counter i at 760 and determine whether the current value of the counter i is less than or equal to the current list size at 765 (i.e., whether i is less than N+1), in which case the UE may again determine whether an attempt to reestablish the lost and/or degraded session with entry i succeeded at 755. However, if the current value of the counter i exceeds the current list size at 765, the UE may have exhausted the interesting Expression list without successfully reestablishing the active link with the current peer and/or any alternate peers in the list, in which case the UE may search for similar Expressions and attempt to reestablish the LTE-D session in the next discovery cycle at 770.

Figure 8:
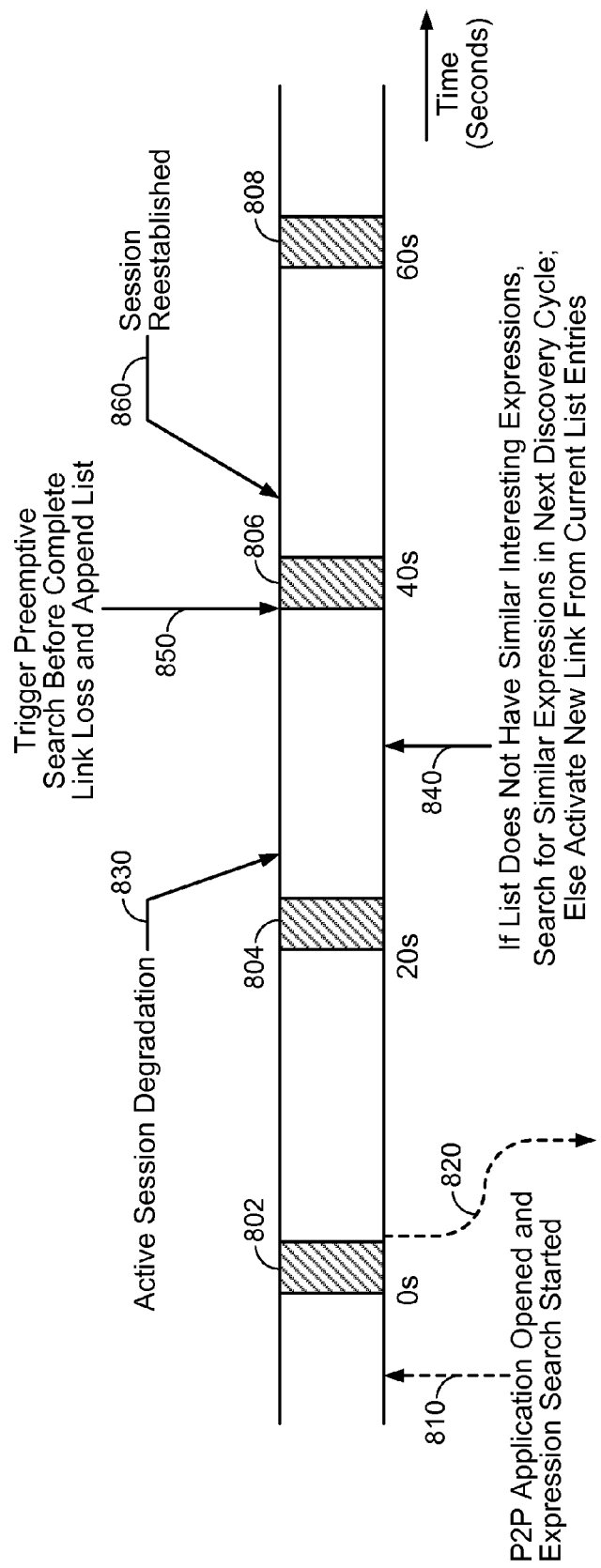
FIG. 8 illustrates an exemplary timeline in which an LTE-D capable device may preemptively search and select LTE-D Expressions in response to a current LTE-D session experiencing degradation to maintain uninterrupted D2D communication prior to loss of the current LTE-D session, according to one aspect of the disclosure.

According to another aspect of the disclosure, FIG. 8 illustrates another exemplary timeline in which an LTE-D capable device may preemptively search and select LTE-D Expressions to maintain uninterrupted D2D communication. However, whereas the timeline shown in FIG. 6 relates to an implementation in which the preemptive search may be proactive (e.g., conducted even if there has not been any loss or degradation in the current session), the timeline shown in FIG. 8 relates to an implementation in which the preemptive search may be triggered in response to detecting that the active session has degraded and conducted in the next discovery cycle prior to the degraded session becoming completely lost. For example, in a similar manner as described above, a UE may initially open a P2P application that supports D2D communication and start an Expression search at 810, discover one or more interesting expressions during discovery cycle 802, and establish an LTE-D link at 820 to initiate a D2D communication session with a peer device selected from a list that was populated with the interesting Expressions discovered in discovery cycle 802.

However, in FIG. 8, the UE may trigger the preemptive search for other Expressions that are similar to the current Expression (i.e., the Expression used to establish the D2D session at 820) in response to detecting that the active session has degraded at 830. Accordingly, the UE may not conduct a search for similar Expressions during discovery cycle 804 that occurs prior to the active session degradation. Instead, in response to detecting the active session degradation at 830, the UE may determine whether the current list has any similar interesting Expressions at 840, in which case the UE may activate a new link or otherwise reestablish the session from the current list entries at 860. Otherwise, in response to determining that the current list does not have any similar interesting Expressions, the UE may search for similar Expressions during the next discovery cycle 806 immediately after the active session degradation was detected. In other words, the next discovery cycle 806 may only be used in the event that the current list does not already have fetched Expressions that match the user's interest (e.g., if the user is listening to a music share of a particular artist and the list does not already have an entry matching that artist, the next discovery cycle 806 may be used to search for a similar expression). In either case, the UE may trigger the preemptive search and append the list at 850 before the active link has been completely lost and then activate the new link or otherwise reestablish the session from the current list entries at 860, thereby ensuring continuity in the LTE-D session and quick recovery from out-of-service scenarios.

Figure 9:
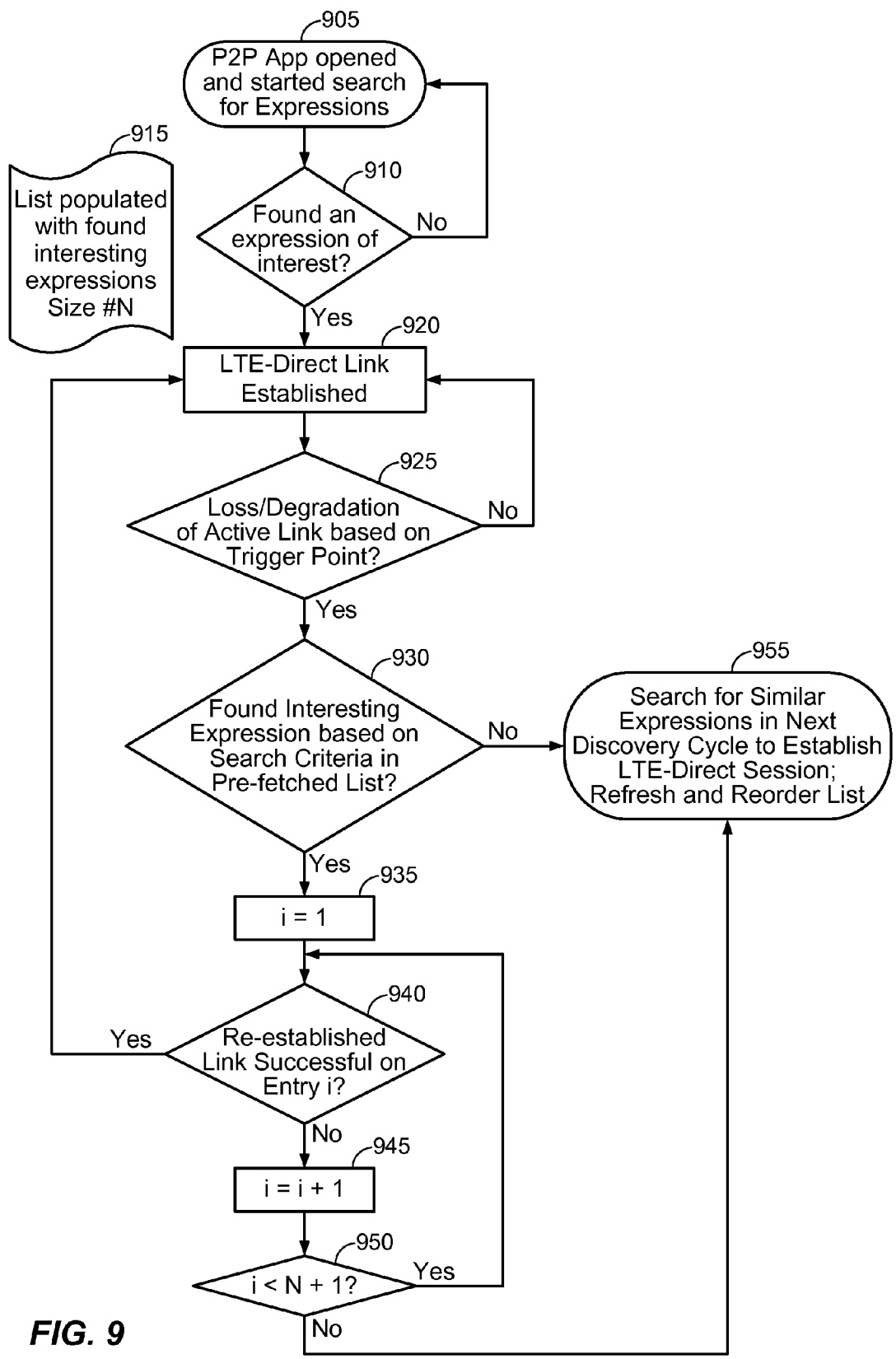
FIG. 9 illustrates an exemplary method in which an LTE-D capable device may preemptively search and select LTE-D Expressions in response to a current LTE-D session experiencing degradation to maintain uninterrupted D2D communication prior to loss of the current LTE-D session, according to one aspect of the disclosure.

According to one aspect of the disclosure, FIG. 9 illustrates an exemplary method in which an LTE-D capable device may preemptively search and select LTE-D Expressions to maintain uninterrupted D2D communication in response to detecting degradation in a current LTE-D session and prior to complete loss of the current LTE-D session, wherein the method shown in FIG. 9 may generally correspond to the timeline shown in FIG. 8. In particular, at 905, a UE may initially open a P2P application that supports D2D communication and start an Expression search. Accordingly, the UE may determine whether any interesting Expressions were found at 910 and repeat the search at 905 in response to determining that no interesting Expressions were found. Otherwise, in response to determining that at least one interesting expression was found, the UE may populate the list with the interesting Expressions that were discovered at 915 and establish an LTE-D link to initiate a D2D communication session with at least one peer UE from the list at 920.

In one embodiment, at 925, the UE may monitor the active session to detect whether the active session has become degraded. For example, at 925, the UE may determine whether a received power on a downlink from the active peer dropped below a threshold value $P_D$, whether a transmit power used to communicate with the active peer on an uplink exceeded a threshold value $P_U$, whether a predefined number of NACKs that indicate bad channel conditions on the uplink and/or the downlink were received, and/or whether other suitable information indicates that the active session may have been become degraded. As such, in response to determining that the active session has become degraded, the UE may start a preemptive selection process at 930 based on the current list. More particularly, at 930, the UE may determine whether the current list has one or more interesting Expressions, wherein the UE may search for similar Expressions in the next discovery cycle at 955 and attempt to reestablish the LTE-D session from the refreshed list in response to determining that the list did not have any similar interesting Expressions at 930. Otherwise, in response to determining that the current list has one or more similar interesting Expressions, the UE may set a counter i to one (1) at 935 and then determine whether an attempt to reestablish the lost and/or degraded session with entry i succeeded at 940. In response to determining that the link was successfully reestablished with entry i, the method may resume from 920. Otherwise, the UE may increment the counter i at 945 and determine whether the current value of the counter i is less than or equal to the current list size at 950 (i.e., whether i is less than N+1), in which case the UE may again determine whether an attempt to reestablish the lost and/or degraded session with entry i succeeded at 940. However, if the current value of the counter i exceeds the current list size at 950, the UE may have exhausted the interesting Expression list without successfully reestablishing the active link with the current peer and/or any alternate peers in the list, in which case the UE may search for similar Expressions and attempt to reestablish the LTE-D session in the next discovery cycle at 955.

Figure 10:
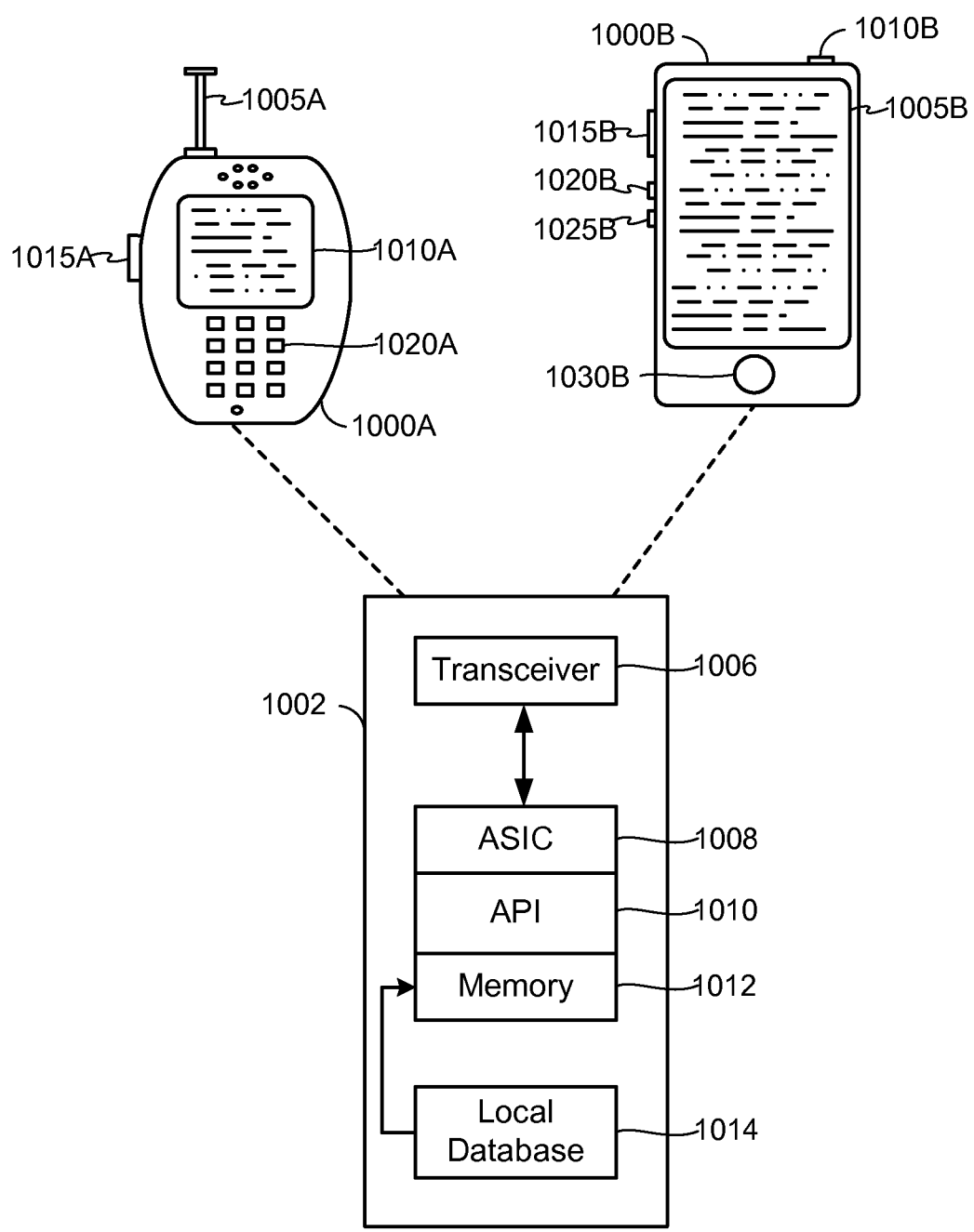
FIG. 10 illustrates examples of user equipments (UEs), according to one aspect of the disclosure.

FIG. 10 illustrates examples of UEs according to one aspect of the disclosure. Referring to FIG. 10, UE 1000A is illustrated as a calling telephone and UE 1000B is illustrated as a touchscreen device (e.g., a smart phone, a tablet computer, etc.). As shown in FIG. 10, an external casing of UE 1000A is configured with an antenna 1005A, display 1010A, at least one button 1015A (e.g., a PTT button, a power button, a volume control button, etc.) and a keypad 1020A among other components, as is known in the art. Also, an external casing of UE 1000B is configured with a touchscreen display 1005B, peripheral buttons 1010B, 1015B, 1020B and 1025B (e.g., a power control button, a volume or vibrate control button, an airplane mode toggle button, etc.), at least one front-panel button 1030B (e.g., a Home button, etc.), among other components, as is known in the art. While not shown explicitly as part of UE 1000B, the UE 1000B can include one or more external antennas and/or one or more integrated antennas that are built into the external casing of UE 1000B, including but not limited to Wi-Fi antennas, cellular antennas, satellite position system (SPS) antennas (e.g., global positioning system (GPS) antennas), and so on.

While internal components of UEs such as the UEs 1000A and 1000B can be embodied with different hardware configurations, a basic high-level UE configuration for internal hardware components is shown as platform 1002 in FIG. 10. The platform 1002 can receive and execute software applications, data and/or commands transmitted from the RAN 120 that may ultimately come from the core network 140, the Internet 175 and/or other remote servers and networks (e.g., application server 170, web URLs, etc.). The platform 1002 can also independently execute locally stored applications without RAN interaction. The platform 1002 can include a transceiver 1006 operably coupled to an application specific integrated circuit (ASIC) 1008, or other processor, microprocessor, logic circuit, or other data processing device. The ASIC 1008 or other processor executes the application programming interface (API) 1010 layer that interfaces with any resident programs in the memory 1012 of the wireless device. The memory 1012 can be comprised of read-only or random-access memory (RAM and ROM), EEPROM, flash cards, or any memory common to computer platforms. The platform 1002 also can include a local database 1014 that can store applications not actively used in memory 1012, as well as other data. The local database 1014 is typically a flash memory cell, but can be any secondary storage device as known in the art, such as magnetic media, EEPROM, optical media, tape, soft or hard disk, or the like.

Accordingly, one embodiment disclosed herein can include a UE (e.g., UE 1000A, 1000B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 1008, memory 1012, API 1010 and local database 1014 may all be used cooperatively to load, store and execute the various functions disclosed herein and thus the logic to perform these functions may be distributed over various elements. Alternatively, the functionality could be incorporated into one discrete component. Therefore, the features of the UEs 1000A and 1000B in FIG. 10 are to be considered merely illustrative and the disclosure is not limited to the illustrated features or arrangement.

The wireless communication between the UEs 1000A and/or 1000B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments disclosed herein and are merely to aid in describing aspects of the embodiments disclosed herein.

Figure 11:
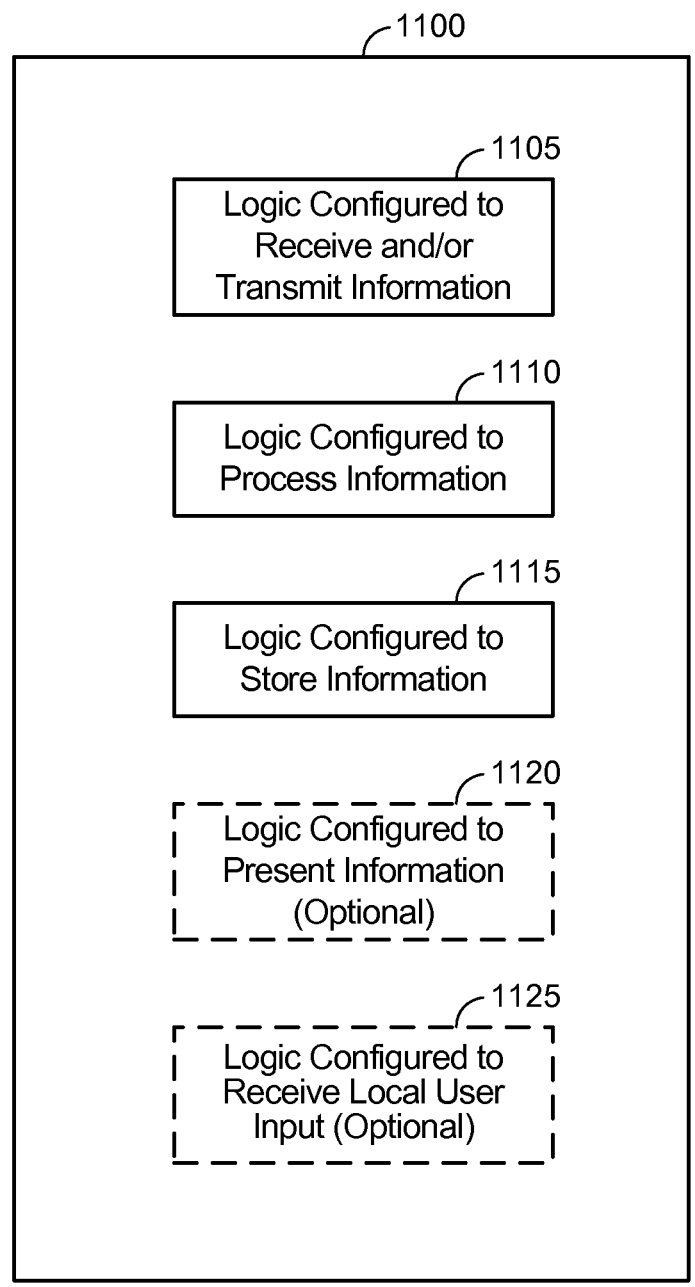
FIG. 11 illustrates a communication device that includes logic configured to perform functionality, according to one aspect of the disclosure.

FIG. 11 illustrates a communication device 1100 that includes logic configured to perform functionality. The communication device 1100 can correspond to any of the above-noted communication devices, including but not limited to UEs 1000A or 1000B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 1100 can correspond to any electronic device that is configured to communicate with (or facilitate communication with) one or more other entities over the wireless communications system 100 of FIG. 1.

Referring to FIG. 11, the communication device 1100 includes logic configured to receive and/or transmit information 1105. In an example, if the communication device 1100 corresponds to a wireless communications device (e.g., UE 1000A or 1000B, one of BSs 200A through 210A, one of Node Bs 200B through 210B, one of eNodeBs 200D through 210D, etc.), the logic configured to receive and/or transmit information 1105 can include a wireless communications interface (e.g., Bluetooth, Wi-Fi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 1105 can correspond to a wired communications interface (e.g., a serial connection, a USB or Firewire connection, an Ethernet connection through which the Internet 175 can be accessed, etc.). Thus, if the communication device 1100 corresponds to some type of network-based server (e.g., PDSN, SGSN, GGSN, S-GW, P-GW, MME, HSS, PCRF, the application 170, etc.), the logic configured to receive and/or transmit information 1105 can correspond to an Ethernet card, in an example, that connects the network-based server to other communication entities via an Ethernet protocol. In a further example, the logic configured to receive and/or transmit information 1105 can include sensory or measurement hardware by which the communication device 1100 can monitor its local environment (e.g., an accelerometer, a temperature sensor, a light sensor, an antenna for monitoring local RF signals, etc.). The logic configured to receive and/or transmit information 1105 can also include software that, when executed, permits the associated hardware of the logic configured to receive and/or transmit information 1105 to perform its reception and/or transmission function(s). However, the logic configured to receive and/or transmit information 1105 does not correspond to software alone, and the logic configured to receive and/or transmit information 1105 relies at least in part upon hardware to achieve its functionality.

Referring to FIG. 11, the communication device 1100 further includes logic configured to process information 1110. In an example, the logic configured to process information 1110 can include at least a processor. Example implementations of the type of processing that can be performed by the logic configured to process information 1110 includes but is not limited to performing determinations, establishing connections, making selections between different information options, performing evaluations related to data, interacting with sensors coupled to the communication device 1100 to perform measurement operations, converting information from one format to another (e.g., between different protocols such as .wmv to .avi, etc.), and so on. For example, the processor included in the logic configured to process information 1110 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1110 can also include software that, when executed, permits the associated hardware of the logic configured to process information 1110 to perform its processing function(s). However, the logic configured to process information 1110 does not correspond to software alone, and the logic configured to process information 1110 relies at least in part upon hardware to achieve its functionality.

Referring to FIG. 11, the communication device 1100 further includes logic configured to store information 1115. In an example, the logic configured to store information 1115 can include at least a non-transitory memory and associated hardware (e.g., a memory controller, etc.). For example, the non-transitory memory included in the logic configured to store information 1115 can correspond to RAM memory, flash memory, ROM memory, EPROM memory, EEPROM memory, registers, hard disk, a removable disk, a CD-ROM, or any other form of storage medium known in the art. The logic configured to store information 1115 can also include software that, when executed, permits the associated hardware of the logic configured to store information 1115 to perform its storage function(s). However, the logic configured to store information 1115 does not correspond to software alone, and the logic configured to store information 1115 relies at least in part upon hardware to achieve its functionality.

Referring to FIG. 11, the communication device 1100 further optionally includes logic configured to present information 1120. In an example, the logic configured to present information 1120 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1100. For example, if the communication device 1100 corresponds to UE 1000A or UE 1000B as shown in FIG. 10, the logic configured to present information 1120 can include the display 1010A of UE 1000A or the touchscreen display 1005B of UE 1000B. In a further example, the logic configured to present information 1120 can be omitted for certain communication devices, such as network communication devices that do not have a local user (e.g., network switches or routers, remote servers, etc.). The logic configured to present information 1120 can also include software that, when executed, permits the associated hardware of the logic configured to present information 1120 to perform its presentation function(s). However, the logic configured to present information 1120 does not correspond to software alone, and the logic configured to present information 1120 relies at least in part upon hardware to achieve its functionality.

Referring to FIG. 11, the communication device 1100 further optionally includes logic configured to receive local user input 1125. In an example, the logic configured to receive local user input 1125 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1100. For example, if the communication device 1100 corresponds to UE 1000A or UE 1000B as shown in FIG. 10, the logic configured to receive local user input 1125 can include the keypad 1020A, any of the buttons 1015A or 1010B through 1025B, the touchscreen display 1005B, etc. In a further example, the logic configured to receive local user input 1125 can be omitted for certain communication devices, such as network communication devices that do not have a local user (e.g., network switches or routers, remote servers, etc.). The logic configured to receive local user input 1125 can also include software that, when executed, permits the associated hardware of the logic configured to receive local user input 1125 to perform its input reception function(s). However, the logic configured to receive local user input 1125 does not correspond to software alone, and the logic configured to receive local user input 1125 relies at least in part upon hardware to achieve its functionality.

Referring to FIG. 11, while the configured logics of 1105 through 1125 are shown as separate or distinct blocks in FIG. 11, it will be appreciated that the hardware and/or software by which the respective configured logic performs its functionality can overlap in part. For example, any software used to facilitate the functionality of the configured logics of 1105 through 1125 can be stored in the non-transitory memory associated with the logic configured to store information 1115, such that the configured logics of 1105 through 1125 each performs their functionality (i.e., in this case, software execution) based in part upon the operation of software stored by the logic configured to store information 1115. Likewise, hardware that is directly associated with one of the configured logics can be borrowed or used by other configured logics from time to time. For example, the processor of the logic configured to process information 1110 can format data into an appropriate format before being transmitted by the logic configured to receive and/or transmit information 1105, such that the logic configured to receive and/or transmit information 1105 performs its functionality (i.e., in this case, transmission of data) based in part upon the operation of hardware (i.e., the processor) associated with the logic configured to process information 1110.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to those skilled in the art from a review of the embodiments described above in more detail.

Figure 12:
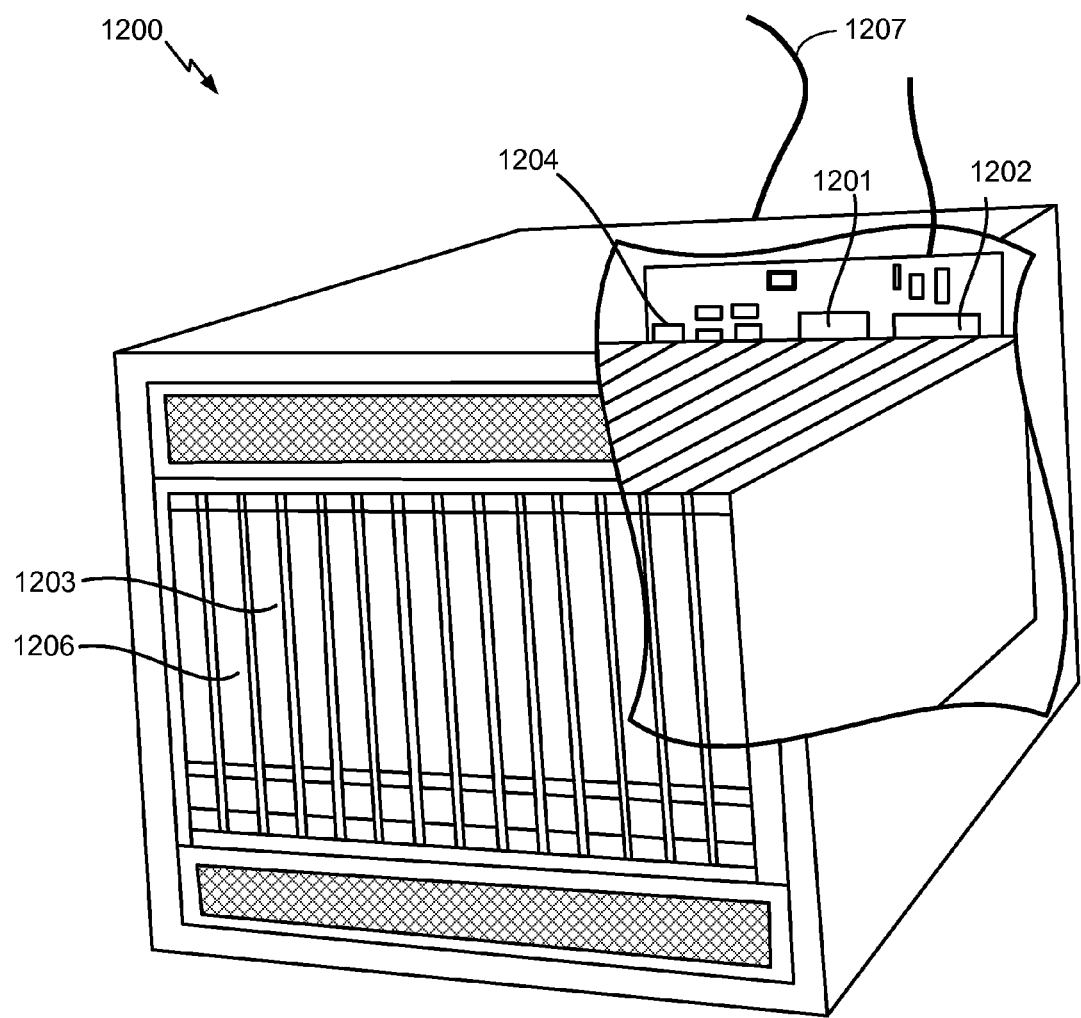
FIG. 12 illustrates an exemplary server, according to one aspect of the disclosure.

The various embodiments disclosed herein may be implemented on any of a variety of commercially available server devices, such as server 1200 illustrated in FIG. 12. In an example, the server 1200 may correspond to one example configuration of the application server described above. In FIG. 12, the server 1200 includes a processor 1201 coupled to volatile memory 1202 and a large capacity nonvolatile memory, such as a disk drive 1203. The server 1200 may also include a floppy disc drive, compact disc (CD) or DVD disc drive 1206 coupled to the processor 1201. The server 1200 may also include network access ports 1204 coupled to the processor 1201 for establishing data connections with a network 1207, such as a local area network coupled to other broadcast system computers and servers or to the Internet. In context with FIG. 11, it will be appreciated that the server 1200 of FIG. 12 illustrates one example implementation of the communication device 1100, whereby the logic configured to transmit and/or receive information 1105 may correspond to the network access points 1204 used by the server 1200 to communicate with the network 1207, the logic configured to process information 1110 may correspond to the processor 1201, and the logic configuration to store information 1115 may correspond to any combination of the volatile memory 1202, the disk drive 1203 and/or the disc drive 1206. The optional logic configured to present information 1120 and the optional logic configured to receive local user input 1125 are not shown explicitly in FIG. 12 and may or may not be included therein. Thus, FIG. 12 helps to demonstrate that the communication device 1100 described above in connection with FIG. 11 may be implemented as a server, in addition to a UE implementation, such as the UEs 1000A and 1000B shown in FIG. 10.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for uninterrupted device-to-device communication, comprising:
   establishing, by a user equipment, a first device-to-device connection with a first peer device, wherein the first device-to-device connection is established to access a service offered by the first peer device;
   triggering a search to discover at least one alternate peer device offering the service offered by the first peer device based at least in part on a transmit power used on an uplink to the first peer device exceeding a threshold value;
   discovering, by the user equipment, while the first device-to-device connection is active, the at least one alternate peer device offering the service offered by the first peer device; and
   establishing, by the user equipment, a second device-to-device connection with the at least one alternate peer device to access the service via the at least one alternate peer device in response to loss or degradation of the first device-to-device connection.

2. The method recited in claim 1, wherein the second device-to-device connection is established prior to a discovery cycle immediately following the loss or degradation of the first device-to-device connection.

3. The method recited in claim 1, further comprising:
   searching for the at least one alternate peer device in one or more discovery cycles after the first device-to-device connection is established and prior to loss or degradation of the first device-to-device connection.

4. The method recited in claim 1, further comprising:
   detecting degradation of the first device-to-device connection; and
   searching for the at least one alternate peer device in a discovery cycle immediately after detecting the degradation of the first device-to-device connection and prior to loss of the first device-to-device connection.

5. The method recited in claim 1, wherein the second device-to-device connection is established without conducting a search following the loss or degradation of the first device-to-device connection.

6. The method recited in claim 1, wherein the first device-to-device connection and the second device-to-device connection comprise LTE-Direct links.

7. The method recited in claim 1, further comprising:
   triggering the search to discover the at least one alternate peer device further based at least in part on a received power on a downlink from the first peer device falling below a threshold value.

8. The method recited in claim 1, further comprising:
   triggering the search to discover the at least one alternate peer device further based at least in part on receiving a predefined number of negative acknowledgments from the first peer device.

9. A wireless device, comprising:
   one or more processors configured to establish a first device-to-device connection with a first peer device to access a service offered by the first peer device, trigger a search to discover at least one alternate peer device offering the service offered by the first peer device based at least in part on a transmit power used on an uplink to the first peer device exceeding a threshold value, discover, while the first device-to-device connection is active, the at least one alternate peer device offering the service offered by the first peer device, and establish a second device-to-device connection with the at least one alternate peer device to access the service via the at least one alternate peer device in response to loss or degradation of the first device-to-device connection; and
   a memory coupled to the one or more processors.

10. The wireless device recited in claim 9, wherein the one or more processors are configured to establish the second device-to-device connection prior to a discovery cycle immediately following the loss or degradation of the first device-to-device connection.

11. The wireless device recited in claim 9, wherein the one or more processors are further configured to search for the at least one alternate peer device in one or more discovery cycles after the first device-to-device connection is established and prior to loss or degradation of the first device-to-device connection.

12. The wireless device recited in claim 9, wherein the one or more processors are further configured to:
    detect degradation of the first device-to-device connection; and
    search for the at least one alternate peer device in a discovery cycle immediately after detecting the degradation of the first device-to-device connection and prior to loss of the first device-to-device connection.

13. The wireless device recited in claim 9, wherein the one or more processors are configured to establish the second device-to-device connection without conducting a search following the loss or degradation of the first device-to-device connection.

14. The wireless device recited in claim 9, wherein the first device-to-device connection and the second device-to-device connection comprise LTE-Direct links.

15. The wireless device recited in claim 9, wherein the one or more processors are further configured to:
    trigger the search to discover the at least one alternate peer device further based at least in part on a received power on a downlink from the first peer device falling below a threshold value.

16. The wireless device recited in claim 9, wherein the one or more processors are further configured to:
    trigger the search to discover the at least one alternate peer device further based at least in part on receiving a predefined number of negative acknowledgments from the first peer device.

17. A wireless device, comprising:
    means for establishing a first device-to-device connection with a first peer device to access a service offered by the first peer device;
    means for triggering a search to discover at least one alternate peer device offering the service offered by the first peer device based at least in part on a transmit power used on an uplink to the first peer device exceeding a threshold value;
    means for discovering, while the first device-to-device connection is active, the at least one alternate peer device offering the service offered by the first peer device; and
    means for establishing a second device-to-device connection with the at least one alternate peer device to access the service via the at least one alternate peer device in response to loss or degradation of the first device-to-device connection.

18. The wireless device recited in claim 17, further comprising:
    means for searching for the at least one alternate peer device in one or more discovery cycles after the first device-to-device connection is established and prior to loss or degradation of the first device-to-device connection.

19. The wireless device recited in claim 17, further comprising:
    means for detecting degradation of the first device-to-device connection; and
    means for searching for the at least one alternate peer device in a discovery cycle immediately after detecting the degradation of the first device-to-device connection and prior to loss of the first device-to-device connection.

20. The wireless device recited in claim 17, further comprising:
    means for triggering the search to discover the at least one alternate peer device further based at least in part on a received power on a downlink from the first peer device falling below a threshold value.

21. The wireless device recited in claim 17, further comprising:
    means for triggering the search to discover the at least one alternate peer device further based at least in part on receiving a predefined number of negative acknowledgments from the first peer device.

22. A non-transitory computer-readable storage medium having computer-executable instructions recorded thereon, wherein executing the computer-executable instructions on a wireless device causes the wireless device to:
    establish a first device-to-device connection with a first peer device, wherein the first device-to-device connection is established to access a service offered by the first peer device;
    trigger a search to discover at least one alternate peer device offering the service offered by the first peer device based at least in part on a transmit power used on an uplink to the first peer device exceeding a threshold value;
    discover, while the first device-to-device connection is active, the at least one alternate peer device offering the service offered by the first peer device; and
    establish a second device-to-device connection with the at least one alternate peer device to access the service via the at least one alternate peer device in response to loss or degradation of the first device-to-device connection.

* * * * *